United States Patent
Morrison et al.

(10) Patent No.: US 10,076,908 B2
(45) Date of Patent: Sep. 18, 2018

(54) INK SUPPLIES AND METHODS TO PREPARE INK SUPPLIES

(71) Applicant: Hewlett-Packard Development Company, L.P., Houston, TX (US)

(72) Inventors: Randal J. Morrison, Vancouver, WA (US); Kuang-Jen Wang, Vancouver, WA (US); Robert N. Stavig, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/654,345

(22) Filed: Jul. 19, 2017

(65) Prior Publication Data

US 2017/0313090 A1    Nov. 2, 2017

Related U.S. Application Data

(63) Continuation of application No. 15/113,335, filed as application No. PCT/US2014/014177 on Jan. 31, 2014, now abandoned.

(51) Int. Cl.
  *B41J 2/165*  (2006.01)
  *B41J 2/175*  (2006.01)
  *G06K 15/02*  (2006.01)

(52) U.S. Cl.
  CPC ............. *B41J 2/175* (2013.01); *B41J 2/1652* (2013.01); *G06K 15/1803* (2013.01); *G06K 15/1809* (2013.01)

(58) Field of Classification Search
  None
  See application file for complete search history.

(56) References Cited

U.S. PATENT DOCUMENTS 6,312,088 B1 *  11/2001  Seino .................. B41J 2/17506
                                                               347/23
6,364,448 B2    4/2002  Nishioka et al.
(Continued)

FOREIGN PATENT DOCUMENTS

CN    1255433    6/2000
CN    1321580    11/2001
(Continued)

OTHER PUBLICATIONS

European Patent Office, "Extended European Search Report," issued in connection with European Patent Application No. 14880460.2, dated Dec. 8, 2017, 7 pages.
(Continued)

*Primary Examiner* — Alejandro Valencia
(74) *Attorney, Agent, or Firm* — Hanley Flight & Zimmerman LLC

(57) ABSTRACT

Ink supplies and methods to prepare an ink supply are disclosed. An example ink supply for a printer includes an ink chamber within a housing of the ink supply. The housing is removably installable within the printer. The ink chamber is to store ink. The ink supply further includes a machine readable storage medium to store a first priming parameter. The machine readable storage medium is carried by the housing of the ink supply. The first priming parameter has a value to cause the printer to configure a first priming procedure of the printer. The first priming parameter has precedence in configuring the first priming procedure over a first corresponding priming parameter stored in a second machine readable storage medium of a second ink supply installed in the printer.

16 Claims, 13 Drawing Sheets

(56) References Cited

U.S. PATENT DOCUMENTS

| | | |
|---|---|---|
| 6,419,343 B1 | 7/2002 | Taylor et al. |
| 6,523,931 B1 | 2/2003 | Cipolla et al. |
| 6,733,112 B2 | 5/2004 | Scheffelin et al. |
| 7,311,381 B2 | 12/2007 | Silverbrook et al. |
| 2005/0024412 A1 | 2/2005 | Hudd et al. |
| 2007/0002105 A1 | 1/2007 | Robertson et al. |
| 2009/0237424 A1 | 9/2009 | Martin et al. |
| 2011/0122186 A1 | 5/2011 | Lebron et al. |
| 2012/0249626 A1 | 10/2012 | Asada |

FOREIGN PATENT DOCUMENTS

| | | |
|---|---|---|
| CN | 1551833 | 12/2004 |
| CN | 101224670 | 7/2008 |
| CN | 101468783 | 7/2009 |
| CN | 102119083 | 7/2011 |
| EP | 0760288 | 3/1997 |
| EP | 0891865 | 1/1999 |
| EP | 0985537 | 3/2000 |
| EP | 1029681 | 8/2000 |
| JP | 2000085153 | 3/2000 |
| JP | 2003266743 | 9/2003 |
| WO | 201511617 | 8/2015 |

OTHER PUBLICATIONS

International Searching Authority, "International Search Report and Written Opinion," issued in connection with PCT Application No. PCT/US2014/014177, dated Oct. 31, 2014, 11 pages.

State Intellectual Property Office of China, "Office Action," issued in connection with Chinese Patent Application No. 201480074481.9, dated Jan. 22, 2017, 9 pages.

Lexmark, "Understanding Print Cartridge Page Yields", Sep. 15, 2011, 7 pages.

United States Patent and Trademark Office, "Restriction and/or Election Requirement," issued in connection with U.S. Appl. No. 15/113,335, dated Dec. 5, 2016, 10 pages.

United States Patent and Trademark Office, "Non-Final Office Action," issued in connection with U.S. Appl. No. 15/113,335, dated Mar. 1, 2017, 12 pages.

United States Patent and Trademark Office, "Final Office Action," issued in connection with U.S. Appl. No. 15/113,335, dated May 23, 2017, 11 pages.

State Intellectual Property Office of China, "Office Action," issued in connection with Chinese Patent Application No. 01480074481.9, dated Sep. 12, 2017, 13 pages.

* cited by examiner

|  | Parameter Name | Initial Value K | Initial Value CMY | Description |
|---|---|---|---|---|
| 202 | ape_boss_only | 1 | 1 | bit to decide whether to permit acumen-based priming events for a new supply (0 = acumen-based primes permitted after initial priming procedure; 1 = no acumen-based primes, initial priming procedure only) |
| 204 | ape_disable | 0 | 0 | bit to disable acumen-based priming (1 = use printer/firmware settings, 0 = enable acumen-based configuration) |
| 206 | ape_total_prime_count_limit_A_and_B | 1 | 1 | APE total priming procedure count limit for A and B-type priming procedures |
| 208 | ape_count_A | 1 | 1 | number of ink supply-based A-type priming procedures are allowed (counts down) |
| 210 | ape_count_B | 0 | 0 | number of ink supply-based B-type priming procedures are allowed (counts down) |
| 212 | ape_total_count | 0 | 0 | total number of acumen-based A & B-type priming procedures have been performed (counts up) |
| 214 | ape_time_trigger_A | 2 | 1 | time trigger to trigger A-type priming procedures (0 disables trigger) |
| 216 | ape_time_trigger_B | 0 | 0 | time trigger to trigger B-type priming procedures (0 disables trigger) |
| 218 | ape_usage_trigger_A | 14 | 7 | ink usage trigger to trigger A-type priming procedures (0 disables trigger) |
| 220 | ape_usage_trigger_B | 0 | 0 | ink usage trigger to trigger B-type priming procedures (0 disables trigger) |
| 222 | ape_prejob_bypass_1 | 1 | 1 | use ink supply age to determine if pre-job priming procedures are to be performed, if ape_total_count > ape_prejob_bypass_1, then no more acumen-based pre-job priming procedures are performed |
| 224 | ape_prejob_bypass_2 | 1 | 1 | use ink supply age to determine if pre-job priming procedures are to be performed, if ape_total_count > ape_prejob_bypass_2, then no more acumen-based pre-job priming procedures are performed |
| 226 | ape_supply_age_switch | 0 | 0 | used to determine whether to use ape_prejob_bypass_1 or ape_prejob_bypass_2 |

FIG. 2

|       |                    | C | M | Y |   |
|-------|--------------------|---|---|---|---|
| Initial | Acumen Count A   | 1 | 1 | 1 |   |
|       | Acumen Count B     | 1 | 1 | 1 |   |
|       | Acumen Total Count | 0 | 0 | 0 |   |
|       | Remaining Count A  |   |   |   | 1 |
|       | Remaining Count B  |   |   |   | 1 |
|       | Total APE primes   |   |   |   | 0 |
| After APE A prime |      |   |   |   |   |
|       | Acumen Count A     | 0 | 0 | 0 |   |
|       | Acumen Count B     | 1 | 1 | 1 |   |
|       | Acumen Total Count | 1 | 1 | 1 |   |
|       | Remaining Count A  |   |   |   | 0 |
|       | Remaining Count B  |   |   |   | 1 |
|       | Total APE primes   |   |   |   | 1 |
|       | APE Prime Complete |   |   |   | 0 |
|       | BOSS Prime Complete|   |   |   | 0 |
| After APE B prime |      |   |   |   |   |
|       | Acumen Count A     | 0 | 0 | 0 |   |
|       | Acumen Count B     | 0 | 0 | 0 |   |
|       | Acumen Total Count | 2 | 2 | 2 |   |
|       | Remaining Count A  |   |   |   | 0 |
|       | Remaining Count B  |   |   |   | 0 |
|       | Total APE primes   |   |   |   | 2 |
|       | APE Prime Complete |   |   |   | 1 |
|       | BOSS Prime Complete|   |   |   | 1 |
| Replace M supply & ape_boss_only = TRUE |   |   |   |   |   |
|       | Acumen Count A     | 0 | 1 | 0 |   |
|       | Acumen Count B     | 0 | 1 | 0 |   |
|       | Acumen Total Count | 2 | 0 | 2 |   |
|       | Remaining Count A  |   |   |   | 0 |
|       | Remaining Count B  |   |   |   | 0 |
|       | Total APE primes   |   |   |   | 2 |
|       | APE Prime Complete |   |   |   | 1 |
|       | BOSS Prime Complete|   |   |   | 1 |

FIG. 3

Initial (302)

| | C | M | Y |
|---|---|---|---|
| Acumen Count A | 1 | 1 | 1 |
| Acumen Count B | 1 | 1 | 1 |
| Acumen Total Count | 0 | 0 | 0 |
| Remaining Count A | | | 1 |
| Remaining Count B | | | 1 |
| Total APE primes | | | 0 |

After APE A prime (304)

| | C | M | Y |
|---|---|---|---|
| Acumen Count A | 0 | 0 | 0 |
| Acumen Count B | 1 | 1 | 1 |
| Acumen Total Count | 1 | 1 | 1 |
| Remaining Count A | | | 0 |
| Remaining Count B | | | 1 |
| Total APE primes | | | 1 |
| APE Prime Complete | | | 0 |
| BOSS Prime Complete | | | 0 |

After APE B prime (306)

| | C | M | Y |
|---|---|---|---|
| Acumen Count A | 0 | 0 | 0 |
| Acumen Count B | 0 | 0 | 0 |
| Acumen Total Count | 2 | 2 | 2 |
| Remaining Count A | | | 0 |
| Remaining Count B | | | 0 |
| Total APE primes | | | 2 |
| APE Prime Complete | | | 1 |
| BOSS Prime Complete | | | 1 |

Replace M supply & ape_boss_only = FALSE (402)

| | C | M | Y |
|---|---|---|---|
| Acumen Count A | 0 | 1 | 0 |
| Acumen Count B | 0 | 1 | 0 |
| Acumen Total Count | 2 | 0 | 2 |
| Remaining Count A | | | 1 |
| Remaining Count B | | | 1 |
| Total APE primes | | | 0 |
| APE Prime Complete | | | 0 |
| BOSS Prime Complete | | | 1 |

After APE A prime (404)

| | C | M | Y |
|---|---|---|---|
| Acumen Count A | 0 | 0 | 0 |
| Acumen Count B | 0 | 1 | 0 |
| Acumen Total Count | 3 | 1 | 3 |
| Remaining Count A | | | 0 |
| Remaining Count B | | | 1 |
| Total APE primes | | | 1 |
| APE Prime Complete | | | 0 |
| BOSS Prime Complete | | | 1 |

After APE B prime (406)

| | C | M | Y |
|---|---|---|---|
| Acumen Count A | 0 | 0 | 0 |
| Acumen Count B | 0 | 0 | 0 |
| Acumen Total Count | 4 | 2 | 4 |
| Remaining Count A | | | 0 |
| Remaining Count B | | | 0 |
| Total APE primes | | | 2 |
| APE Prime Complete | | | 1 |
| BOSS Prime Complete | | | 1 |

FIG. 4

| Initial | C | M | Y | |
|---|---|---|---|---|
| Acumen Count A | 1 | 1 | 1 | |
| Acumen Count B | 1 | 1 | 1 | |
| Acumen Total Count | 0 | 0 | 0 | |
| Remaining Count A | | | | 1 |
| Remaining Count B | | | | 1 |
| Total APE primes | | | | 0 |

302

| After APE A prime | | | | |
|---|---|---|---|---|
| Acumen Count A | 0 | 0 | 0 | |
| Acumen Count B | 1 | 1 | 1 | |
| Acumen Total Count | 1 | 1 | 1 | |
| Remaining Count A | | | | 0 |
| Remaining Count B | | | | 1 |
| Total APE primes | | | | 1 |
| APE Prime Complete | | | | 0 |
| BOSS Prime Complete | | | | 0 |

304

| Replace M supply & ape_boss_only = TRUE | | | | |
|---|---|---|---|---|
| Acumen Count A | 0 | 1 | 0 | |
| Acumen Count B | 1 | 1 | 1 | |
| Acumen Total Count | 1 | 0 | 1 | |
| Remaining Count A | | | | 0 |
| Remaining Count B | | | | 1 |
| Total APE primes | | | | 1 |
| APE Prime Complete | | | | 0 |
| BOSS Prime Complete | | | | 0 |

502

| After APE B prime | | | | |
|---|---|---|---|---|
| Acumen Count A | 0 | 1 | 0 | |
| Acumen Count B | 0 | 0 | 0 | |
| Acumen Total Count | 2 | 1 | 2 | |
| Remaining Count A | | | | 0 |
| Remaining Count B | | | | 0 |
| Total APE primes | | | | 2 |
| APE Prime Complete | | | | 1 |
| BOSS Prime Complete | | | | 1 |

| Initial | C | M | Y | |
|---|---|---|---|---|
| Acumen Count A | 1 | 1 | 1 | |
| Acumen Count B | 1 | 1 | 1 | |
| Acumen Total Count | 0 | 0 | 0 | |
| Remaining Count A | | | | 1 |
| Remaining Count B | | | | 1 |
| Total APE primes | | | | 0 |

― 302

| After APE A prime | | | | |
|---|---|---|---|---|
| Acumen Count A | 0 | 0 | 0 | |
| Acumen Count B | 1 | 1 | 1 | |
| Acumen Total Count | 1 | 1 | 1 | |
| Remaining Count A | | | | 0 |
| Remaining Count B | | | | 1 |
| Total APE primes | | | | 1 |
| APE Prime Complete | | | | 0 |
| BOSS Prime Complete | | | | 0 |

― 304

| Replace M supply & ape_boss_only = FALSE | | | | |
|---|---|---|---|---|
| Acumen Count A | 0 | 1 | 0 | |
| Acumen Count B | 1 | 1 | 1 | |
| Acumen Total Count | 1 | 0 | 1 | |
| Remaining Count A | | | | 1 |
| Remaining Count B | | | | 1 |
| Total APE primes | | | | 1 |
| APE Prime Complete | | | | 0 |
| BOSS Prime Complete | | | | 0 |

― 502

| After APE B prime | | | | |
|---|---|---|---|---|
| Acumen Count A | 0 | 1 | 0 | |
| Acumen Count B | 0 | 0 | 0 | |
| Acumen Total Count | 2 | 1 | 2 | |
| Remaining Count A | | | | 1 |
| Remaining Count B | | | | 0 |
| Total APE primes | | | | 1 |
| APE Prime Complete | | | | 0 |
| BOSS Prime Complete | | | | 0 |

― 602

| After APE A prime | | | | |
|---|---|---|---|---|
| Acumen Count A | 0 | 0 | 0 | |
| Acumen Count B | 0 | 0 | 0 | |
| Acumen Total Count | 3 | 2 | 3 | |
| Remaining Count A | | | | 0 |
| Remaining Count B | | | | 0 |
| Total APE primes | | | | 2 |
| APE Prime Complete | | | | 1 |
| BOSS Prime Complete | | | | 1 |

Previous – boss priming completed — 702

|  | C | M | Y | K |
|---|---|---|---|---|
| ape_boss_only | TRUE | TRUE | FALSE | TRUE |
| ape_count_a |  |  | 1 |  |
| ape_count_b |  |  | 1 |  |
| a+b |  |  | 2 |  |
| Selected |  |  | X | X |

Change C supply — 704

|  | C | M | Y | K |
|---|---|---|---|---|
| ape_boss_only | FALSE | TRUE | FALSE | TRUE |
| ape_count_a | 2 |  | 1 |  |
| ape_count_b | 1 |  | 1 |  |
| a+b | 3 |  | 2 |  |
| Selected | X |  |  | X |

Change M supply — 706

|  | C | M | Y | K |
|---|---|---|---|---|
| ape_boss_only | FALSE | TRUE | FALSE | TRUE |
| ape_count_a | 2 | 2 | 1 |  |
| ape_count_b | 1 | 2 | 1 |  |
| a+b | 3 | 4 | 2 |  |
| Selected | X |  |  | X |

Change C supply — 708

|  | C | M | Y | K |
|---|---|---|---|---|
| ape_boss_only | TRUE | TRUE | FALSE | TRUE |
| ape_count_a | 2 | 2 | 1 |  |
| ape_count_b | 1 | 2 | 1 |  |
| a+b | 3 | 4 | 2 |  |
| Selected |  |  | X | X |

Change Y and K supplies — 710

|  | C | M | Y | K |
|---|---|---|---|---|
| ape_boss_only | TRUE | TRUE | TRUE | TRUE |
| ape_count_a | 2 | 2 | 2 | 2 |
| ape_count_b | 1 | 2 | 1 | 2 |
| a+b | 3 | 4 | 3 | 4 |
| Selected |  |  | X | X |

FIG. 7

INK SUPPLIES AND METHODS TO PREPARE INK SUPPLIES

RELATED APPLICATION

This patent arises from a continuation of U.S. patent application Ser. No. 15/113,335 filed on Jul. 21, 2016 as a national stage entry of International PCT Application No. PCT/US14/14177 filed on Jan. 31, 2014. U.S. patent application Ser. No. 15/113,335 and International PCT Application No. PCT/US14/14177 are hereby incorporated herein by reference in their entireties.

BACKGROUND

Inkjet printing typically includes providing fluid ink to a print head. The print head may be part of a cartridge containing the ink or may be separate from an ink supply. When the print head and ink supply are separate, the print head obtains ink via an ink line or tube.

BRIEF DESCRIPTION OF THE DRAWINGS

FIG. 2 is a table illustrating example parameters stored in an acumen storage device associated with an ink supply in accordance with the teachings of this disclosure.

FIGS. 3-6 illustrate example scenarios of configuring a printer based on priming parameters obtained from a storage device associated with an ink supply constructed in accordance with the teachings of this disclosure.

FIG. 7 is a table illustrating example scenarios for selecting a representative one of multiple acumen storage devices and/or sets of priming parameters for a print head.

Wherever appropriate, the same reference numbers will be used throughout the drawing(s) and accompanying written description to refer to the same or like parts.

DETAILED DESCRIPTION

Traditionally, inkjet priming procedures have been defined and implemented in firmware. Since firmware is often finalized at an early date in development of the printer, late-stage changes to priming procedure triggers may be expensive or impractical to implement. Additionally, priming procedure triggers (e.g., events to which the printer responds by performing a priming procedure) that are implemented in firmware may not be modifiable after the printer has shipped.

In contrast with known methods of configuring printers for priming, example methods, printers, and ink supplies disclosed herein use acumen-based priming events (APE) to configure a printer to perform priming procedures. Example ink supplies disclosed herein include an acumen storage device (also referred to as an acumen chip), which includes a non-volatile machine readable storage or memory device. Example acumen storage devices store priming parameters (e.g., data) for the ink supply with which they are associated. Acumen-based priming events or procedures refer to priming procedures that are initiated, triggered, and/or scheduled based on one or more parameters stored in an acumen storage device associated with an ink supply.

At an initial startup of a printer (e.g., when a purchaser of the printer first sets up the printer for use), the print heads of the printer must be prepared to print. For example, air may be present in the ink lines that must be cleared for ink from respective ink supplies to be provided to the print heads. As used herein, the process of preparing print heads and/or ink supplies for printing is referred to as "priming," or performing priming procedures. Examples of priming include purging air from the ink lines to provide ink to the print heads and/or purging air from the print heads themselves.

Different inks may have different chemical formulations that require different priming procedures by the printer. Rather than attempting to anticipate and handle all possible ink formulations, example methods, printers, and ink supplies disclosed herein enable a printer to understand the priming procedures for any compatible ink supply by accessing the priming parameters stored in the acumen storage device of the ink supply.

Example ink supplies disclosed herein include an ink chamber to store ink, and a machine readable storage medium to store a priming parameter having a value. The value is to cause a printer to configure a priming procedure of the printer.

Example methods disclosed herein include filling an ink chamber of an ink supply with ink and storing a value for a priming parameter in a machine readable storage medium carried by the ink supply.

Figure 1:
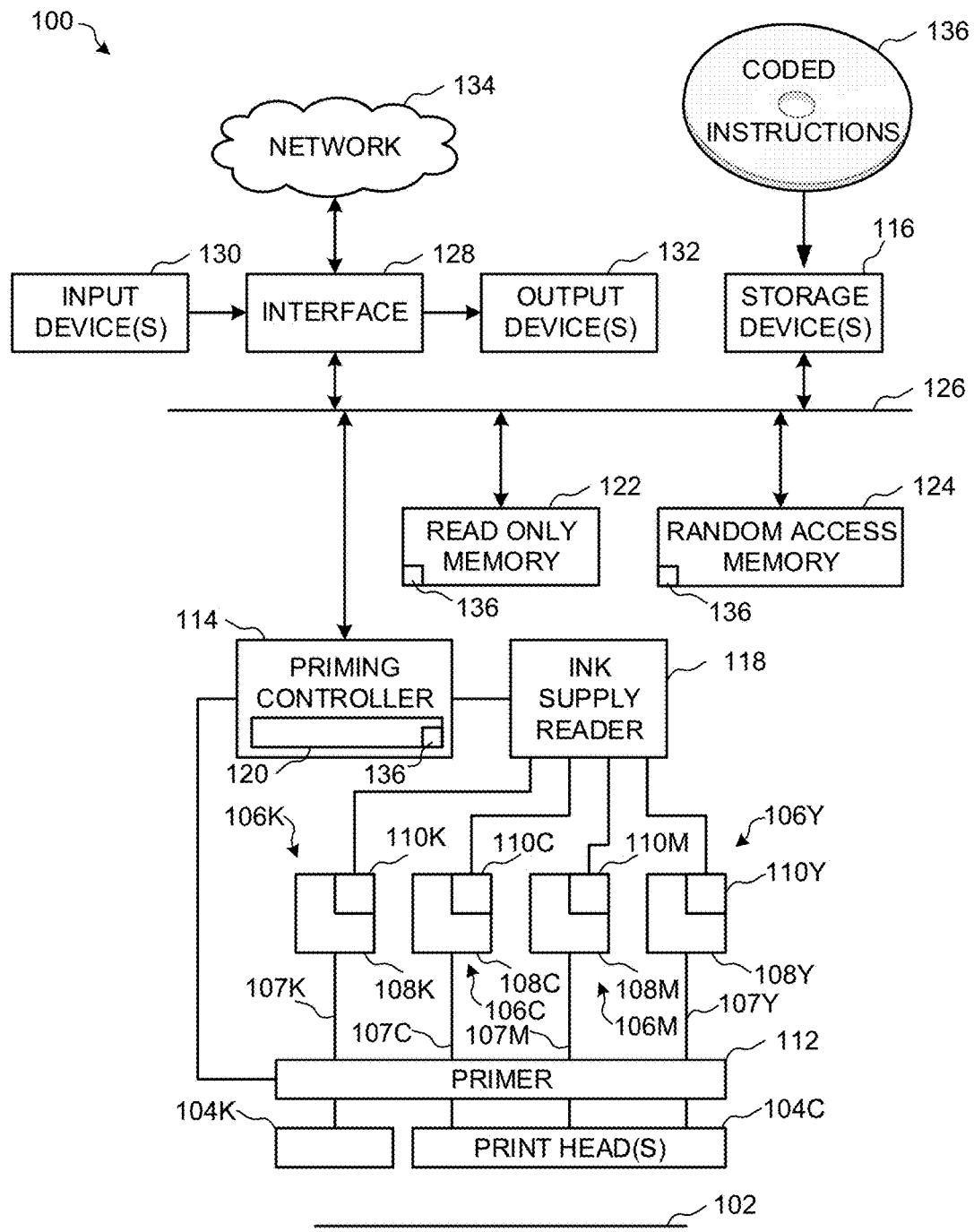
FIG. 1 is a block diagram of an example printer configured to print and perform priming procedures using an ink supply constructed in accordance with the teachings of this disclosure.

FIG. 1 is a block diagram of an example printer 100. The example printer 100 of FIG. 1 generates hard images on a substrate 102 by jetting ink onto the substrate in accordance with image data. The example printer 100 includes one or more print head(s) 104K, 104C to jet one or more colors of ink onto the substrate 102.

Ink supplies 106K, 106C, 106M, 106Y provide the ink to the print heads 104 via corresponding ink lines 107K, 107C, 107M, 107Y (e.g., tubes). The example ink supplies 106K, 106C, 106M, 106Y of FIG. 1 each include a respective ink tank 108K, 108C, 108M, 108Y (or ink chamber) and a respective acumen storage device 110K, 110C, 110M, 110Y.

The print heads 104K, 104C are referred to generically herein using reference numeral 104. The ink supplies 106K, 106C, 106M, 106Y are referred to generically herein using reference numeral 106. The ink tanks 108K, 108C, 108M, 108Y are referred to generically herein using reference numeral 108. The acumen storage devices 110K, 110C, 110M, 110Y are referred to generically herein using reference numeral 110. Accordingly, when a print head 104, an ink supply 106, an ink tank 108, or an acumen storage device 110 is referred to generically, the description may be applied to any of the print head(s) 104K, 104C, the ink supplies 106K, 106C, 106M, 106Y, the ink tanks 108K, 108C, 108M, 108Y, or the acumen storage devices 110K, 110C, 110M, 110Y, respectively.

The ink tank 108 holds the ink (e.g., pigment and carrier fluid, dye and carrier fluid, or other ink formulation) used by the printer 100 to print on the substrate 102. Each ink tank 108 carries an acumen storage device 110 (e.g., in its housing).

The example printer 100 of FIG. 1 includes a primer 112 to perform one or more priming functions or procedures on the print head(s) 104, the ink supplies 106, and/or the ink lines 107. For example, the primer 112 may perform a first priming procedure to prepare the printer 100 to be used, such as converting the printer 100 from a shipping state (e.g., no ink in the printer 100) to a printing state (e.g., the print head(s) 104 have access to ink for immediate use to print).

In the example of FIG. 1, the primer 112 may perform different types of priming procedures, which may be appropriate for different situations or events occurring at the printer 100. Example primers and priming procedures that may be implemented by the primer 112 are described in U.S. Pat. No. 6,419,343 and in U.S. Pat. No. 5,736,992. Different types of priming procedures (also referred to as "primes") are discussed herein, including so-called A-type priming procedures and B-type priming procedures. A "boss" priming procedure described herein includes performing an A-type priming procedure and a B-type priming procedure. For a boss priming procedure to be completed for an ink supply 106, at least one A-type priming procedure and at least one B-type priming procedure must be performed on the print head 104 coupled to that ink supply 106.

The timing of the priming functions performed by the primer 112 is controlled by a priming controller 114. The example priming controller 114 instructs the primer 112 to perform priming procedure(s) based on printer parameters stored in one or more storage devices 116, which are described in more detail below. The example priming controller 114 also configures the printer parameters to instruct the primer 112 to perform (or not perform) subsequent priming procedure(s) during the service life of the printer and/or during the service life of the ink supplies 106.

To configure the printer parameters to control the priming procedures, the example priming controller 114 of FIG. 1 obtains values of priming parameters from the acumen storage devices 110 via an ink supply reader 118. The example ink supply reader 118 of FIG. 1 accesses the acumen storage devices 110 of the ink supplies 106 to read or access values of priming parameters stored on the acumen storage devices 110. Because different ones of the ink supplies 106 (e.g., ink supplies for different colors) may have different chemical formulations, the priming procedures associated with each of the ink supplies 106 may also be different. For example, certain formulations of ink may require periodic priming of the associated print head(s) 104 to maintain printing performance of the printer 100 (e.g., due to settling of the pigment or dye in the ink supply 106, gas build-up in the tank 108, etc.). Such priming procedure requirements may be known from research performed while developing (or engineering) the ink or the ink supply. The example acumen storage devices 110 store priming parameters having values that may be consulted by the ink supply reader 118 and/or the priming controller 114 to configure the printer 100 for maintenance procedures.

FIG. 2 is a table 200 illustrating example parameters 202-226 stored in one of the example acumen storage devices 110 of FIG. 1 associated with an ink supply 106. For example, the ink supply 106 associated with the acumen may be associated with an ink color such as black (K), cyan (C), magenta (M), and/or yellow (Y). Each of the example acumen storage devices 110 of FIG. 1 stores a set (or subset) of the parameters 202-226 with respective values (e.g., values within a permissible range and within the number of bits allotted to the parameter 202-226). The values of the example parameters 202-226 in the acumen storage device 110 may be read and/or written to by the ink supply reader 118. Example initial values 228, 230 stored on the acumen storage device 110 are shown for black (values 228) and color (e.g., cyan, magenta, yellow, etc.) (values 230).

The example parameters 202-226 of FIG. 2 are described below with reference to an example one of the acumen storage devices 110 of FIG. 1 that is associated with an example one of the print heads 104 of FIG. 1. For example, one of the acumen storage devices 110 is associated with an ink supply 106 that provides black ink to a black ink print head 104, while another of the ink supplies 106C that provides cyan ink to a cyan print head 104C (or cyan, magenta, and yellow print head 104) has another acumen storage device 110.

The example parameter ape_boss_only 202 of FIG. 2 is a parameter used by the example priming controller 114 of FIG. 1 to determine whether to configure the printer 100 to permit acumen-based priming procedures. For example, while the printer 100 performs one or more initial priming procedures (e.g., at the time of an initial or out-of-box set up, prior to any printing by the printer 100), the need for and/or desirability of subsequent priming procedures may be dependent on the ink supplies 106 (e.g., the chemical formulations of the ink). The value of the example parameter ape_boss_only 202 may be set to 0 at the acumen storage device 110 of an ink supply 106 to cause the priming controller 114 to configure the printer 100 to perform subsequent acumen-based priming procedures. Conversely, the value of the parameter ape_boss_only 202 may be set to '1' or 'true' at the acumen storage device 110 to cause the priming controller 114 to configure the printer 100 not to perform subsequent priming procedures on the print head 104 associated with the acumen storage device 110. The specific configuration of the printer 100 when the parameter ape_boss_only 202 is set to '0' or 'false' is based on others of the parameters as described below.

The value of the example parameter ape_disable 204 of FIG. 2 causes the priming controller 114 to configure the printer 100 based on the parameters 202, 206-226 of FIG. 2 or to use default configuration parameters of the printer 100. For example, if the parameter ape_disable 204 value is set to 1, the priming controller 114 uses the default printer settings to configure subsequent priming procedures for the print head(s) 104 associated with the acumen storage device 110. In contrast, if the parameter ape_disable 204 value is set to 0, the example priming controller 114 configures the printer 100 to perform (or not perform) subsequent priming procedures based on values of one or more of the parameters 202, 206-226.

When the parameter ape_disable 204 is set to '0,' the example priming controller 114 may load and/or configure the printer 100 based on counts of priming procedures set in the acumen storage device 110 using values of example parameters 206-212. The example parameter ape_total_prime_count_limit_A_and_B 206 sets a number of acumen-based priming procedures that may be performed by the primer 112 on the print head(s) 104 associated with the acumen storage device 110. The parameter ape_total_prime_count_limit_A_and_B 206 represents the limit of total priming procedures including A-type and B-type priming procedures. The example parameter ape_count_A 208 sets a number of A-type priming procedures that are permitted to be performed on the print head 104 associated with the acumen storage device 110. Similarly, the example parameter ape_count_B 210 sets a number of B-type priming procedures that are permitted to be performed on the print head 104 associated with the acumen storage device 110. The example parameters ape_count_A 208 and ape_count_B 210 count down from an initial value. The parameter ape_total_count 212 counts a total number of acumen-based A-type and B-type priming procedures that have been performed on the print head 104 associated with the acumen storage device 110. The example parameter ape_total_count 212 is a count, rather than a limit (e.g., like the parameter ape_total_prime_count_limit_A_and_B 206).

The values for the example parameters 208, 210, and 212 may be set or updated by the example ink supply reader 118 of FIG. 1 with a current value when, for example, an A-type or B-type priming procedure is performed. For example, when the primer 112 of the illustrated example performs an A-type priming procedure on the print head 104K associated with the black ink supply 106K, the ink supply reader 118 decrements the value of the parameter ape_count_A 208 and/or increments the value of the parameter ape_total_count 212 stored in the acumen storage device 110 associated with the black ink supply 106. Additionally or alternatively, when the primer 112 of the illustrated example performs a B-type priming procedure on the print head 104C associated with the cyan ink supply 106C, the ink supply reader 118 decrements the value of the parameter ape_count_B 210 and/or increments the value of the parameter ape_total_count 212 stored in the acumen storage device 110 associated with the cyan ink supply 106.

The example priming controller 114 of FIG. 1 configures one or more printer parameters to perform acumen-based priming procedures based on triggers specified in the acumen storage devices 110. For example, triggers may include time-based and/or usage-based triggers. The example parameters ape_time_trigger_A 214 and ape_time_trigger_B 216 set respective time-based triggers. At the expiration of a time period defined by the parameter ape_time_trigger_A 214, the priming controller 114 instructs (or schedules) the primer 112 to perform an A-type priming procedure on the print head 104 associated with the acumen storage device 110. Similarly, at the expiration of a time period defined by the parameter ape_time_trigger_B 216, the priming controller 114 instructs (or schedules) the primer 112 to perform a B-type priming procedure on the print head 104 associated with the acumen storage device 110. The example priming controller 114 may implement the time-based triggers by setting a watchdog to flag the expiration of the time period(s) defined by the parameters ape_time_trigger_A 214 and/or ape_time_trigger_B 216.

The values of the example parameters ape_time_trigger_A 214 and/or ape_time_trigger_B 216 are in units of hours, but may be in any other unit of time (e.g., seconds, minutes, days, weeks, months, etc.). Additionally or alternatively, to reduce a number of bits required to be stored in the acumen storage device 110 to express a time-based trigger, the example priming controller 114 of FIG. 1 applies respective multipliers to the value(s) stored in the example parameters ape_time_trigger_A 214 and/or ape_time_trigger_B 216. For example, the example priming controller 114 of FIG. 1 interprets the initial value for black (K) stored in the table 200 for ape_time_trigger_A 214 in units of hours and/or applies a scale factor of 1 hour to the value stored in the table 200 for the parameter ape_time_trigger_A 214.

The example parameters ape_usage_trigger_A 218 and ape_usage_trigger_B 220 define usage trigger values. For example, when the print head 104 associated with the acumen storage device 110 has used an amount of ink from the corresponding ink supply 106 equal to or greater than an amount defined by the parameter ape_usage_trigger_A 218, the priming controller 114 instructs (or schedules) the primer 112 to perform an A-type priming procedure on the print head 104 associated with the acumen storage device 110. Similarly, when the print head 104 associated with the acumen storage device 110 has used an amount of ink from the corresponding ink supply 106 equal to or greater than an amount defined by the parameter ape_usage_trigger_B 220, the priming controller 114 instructs (or schedules) the primer 112 to perform a B-type priming procedure on the print head 104 associated with the acumen storage device 110.

In the illustrated example, the values of the example parameters ape_usage_trigger_A 218 and ape_usage_trigger_B 220 are defined in units of volume (e.g., units of 100 milligrams (mg)). As with the time-based triggers, the example priming controller 114 of FIG. 1 applies respective multipliers to the value(s) stored in the example parameters ape_usage_trigger_A 218 and ape_usage_trigger_B 220 to reduce a number of bits required to be stored in the acumen storage device 110 to express a usage-based trigger. For example, the priming controller 114 of FIG. 1 interprets the initial value for cyan (C) stored in the table 200 for ape_usage_trigger_A 218 in units of 100 mg and/or applies a scale factor of 100 mg to the value stored in the table 200 for the parameter ape_usage_trigger_A 218. The priming controller 114 of the illustrated example instructs a watchdog to flag a measured ink usage by the print heads 104 that is greater than or equal to the scaled value(s) set in the parameters ape_usage_trigger_A 218 and ape_usage_trigger_B 220.

In the illustrated example, any or all of the example parameters 214-220 may be set to 0 to disable the associated trigger (e.g., watchdog) for the corresponding type of priming procedure. In some examples, any or all of the watchdogs set by the priming controller 114 may be reset by one or more printing events.

Because some ink supplies 106 may have chemical formulations that cause complications for the print head(s) 104 as the ink supplies 106 age, the example acumen storage device 110 of FIG. 1 includes parameters to control priming procedures based on the age of the ink supply 106. The example parameters ape_prejob_bypass_1 222 and ape_prejob_bypass_2 224 are parameters used by the priming controller 114 to configure the printer 100 to perform (or not perform) pre-job priming procedures (e.g., priming procedures to be performed immediately before a printing task or job). In the example of FIG. 2, the parameter ape_prejob_bypass_1 222 is used by the priming controller 114 when the associated ink supply is younger (e.g., has an age less than a threshold) and the parameter ape_prejob_bypass_2 224 is used by the priming controller 114 when the associated ink supply is older (e.g., has an age greater than a threshold).

The example priming controller 114 of FIG. 1 uses the parameter ape_supply_age_switch 226 to determine the age threshold value at which the priming controller 114 stops using the parameter ape_prejob_bypass_1 222 and begins using the parameter ape_prejob_bypass_2 224 to configure the printer 100 to perform (or not perform) pre-job priming procedures. Whether using ape_prejob_bypass_1 222 or ape_prejob_bypass_2 224 to perform the configuration, the example priming controller 114 of FIG. 1 permits pre-job priming procedures (e.g., pre-job priming procedures requested by the printer 100 firmware) when the value of the parameter ape_total_count 212 associated with (e.g., stored in) the acumen storage device 110 is less than or equal to the value of the appropriate one of the parameters ape_prejob_bypass_1 222 or ape_prejob_bypass_2 224. Conversely, the priming controller 114 of the illustrated example configures the printer 100 not to perform pre-job priming procedures (e.g., to ignore requests for pre-job priming procedures, to convert or reschedule requested pre-job priming procedures to another type of priming procedure) when the value of the parameter ape_total_count 212 associated with (e.g., stored in) the acumen storage device 110 is greater than the value of the appropriate one of the parameters ape_prejob_bypass_1 222 or ape_prejob_bypass_2 224.

The example priming controller 114 of FIG. 1 accesses values of one or more of the priming parameters stored in the acumen storage devices 110 (e.g., via the ink supply reader 118) and configures the printer 100 to perform (or not perform) priming procedures subsequent to the completion of an initial priming procedure. In the example of FIG. 1, the priming controller 114 maintains, sets, and/or updates appropriate printer parameters stored in a storage device 116. For example, the priming controller 114 stores and/or updates parameters for a number of remaining A-type priming procedures for a corresponding ink supply 106 (e.g., ape_primes_remaining_A, which is a local copy of the ape_count_A parameter 208 stored in the acumen storage devices 110), a number of remaining B-type priming procedures for the corresponding ink supply 106 (e.g., ape_primes_remaining_B, which is a local copy of the ape_count_B parameter 210 stored in the acumen storage devices 110), a total number of acumen-based priming procedures performed for the corresponding ink supply 106 (e.g., ape_total_count, which is a local copy of the ape_total_count parameter 212 stored in the acumen storage devices 110), an initial priming completion indicator for the corresponding ink supply 106 (e.g., boss_prime_completed), and an acumen-based priming completion indicator for the corresponding ink supply 106 (e.g., ape_primes_completed). In the example of FIG. 1, the storage device 116 maintains an array of these printer parameters for each ink supply 106, each acumen storage device 110, and/or for each print head 104.

Because they may be jetted from the same or closely adjacent print heads, the cyan, magenta, and yellow print head(s) 104 may be configured to be primed simultaneously in the printer 100. The printer 100 selects any one of the acumen storage devices 110 associated with any one of the cyan, magenta, or yellow ink supplies 106 to control the values of the parameters ape_primes_remaining_A, ape_primes_remaining_B, and/or ape_total_count and, thus, to control the configuration of the printer parameters for priming the cyan, magenta, and/or yellow print head 104C. For example, the selection of one of the acumen storage devices 110 may be performed by the priming controller 114 based on respective values of the parameters 202-226 stored in the acumen storage devices 110. In some examples, the values of the ape_primes_remaining_A, ape_primes_remaining_B, and/or ape_total_count parameters are local copies from the selected one of the acumen storage devices 110.

In the example of FIG. 1, the ink supplies 106C, 106M, and 106Y all provide ink to a same print head 104C (or set of print heads). The example print head(s) 104C undergo a priming procedure that affects the ink supplies 106C, 106 M, 106Y and/or the lines 107C, 107M, 107Y simultaneously, regardless of which of the acumen storage devices 110C, 110M, 110Y causes an acumen-based priming procedure. The example priming controller 114 selects one of the acumen storage devices 110C, 110M, 110Y to be representative of the print head 104C for the purposes of configuring the printer 100 to perform priming procedures on the print head 104C. In the example printer 100 of FIG. 1, the priming controller 114 determines the representative acumen storage device 110 from multiple acumen storage devices 110C, 110M, 110Y by: a) selecting one of the acumen storage devices 110 that is the only one of the possible acumen storage devices 110 that has a priming parameter ape_boss_only 202 value of 'false,' and/or b) when multiple acumen storage devices 110 that have a priming parameter ape_boss_only 202 value of 'false,' selecting the one of the acumen storage devices 110 that has a highest sum of the values for priming parameters ape_count_A+ape_count_B.

In the example of FIG. 1, the boss_prime_completed indicates whether an initial priming procedure has been completed by the primer 112 for the printer 100. The initial priming procedure typically occurs after the printer 100 is first set up and before the printer 100 performs any printing jobs. Thus, the printer 100 may be configured (e.g., when the printer 100 is manufactured and/or programmed with software and/or firmware) with the boss_prime_completed parameter having a value of '0' or 'false,' indicating that the initial priming procedure has not been completed.

The example priming controller 114 of FIG. 1 sets the value of the boss_prime_completed parameter to '1' or 'true' when the primer 112 completes the initial priming procedure. The initial priming procedure is considered to be completed (e.g., the boss_prime_completed parameter remains at a value of '1' or 'true') even when one or more of the ink supplies 106 have been changed. However, if one or more of the print heads 104 are changed (e.g., replaced), the example priming controller 114 may set the boss_prime_completed parameter to '0' or 'false' to indicate that the initial priming procedure has not been completed for the new (e.g., replacement) print heads 104.

In the example of FIG. 1, the ape_primes_completed parameter may be set to '0' or 'false' when any acumen-based priming procedures have yet to be performed. Conversely, when all acumen-based priming procedures have been performed (e.g., the ape_primes_remaining_A and ape_primes_remaining_B are equal to 0), the ape_primes_completed parameter is set to '1' or 'true.' Unlike the example boss_prime_complete parameter, the example ape_primes_completed may be reset to '0' or 'false' when a change to the printer 100 (e.g., a new ink supply is provided) results in one or more acumens storage devices 110 having acumen-based priming procedures to be performed. For example, if the black ink supply 106K is changed (e.g., provided with a new chemical formulation) and the new black ink supply 106K includes a new acumen storage device 110K with values of ape_count_A 208 and/or ape_count_B 210 that are greater than 0, the example priming controller 114 of FIG. 1 determines that additional acumen-based priming procedures may be performed and changes the ape_primes_completed parameter to '0' or 'false.'

The priming controller 114 of the illustrated example includes hardware. For example, the priming controller 114 can be implemented by one or more integrated circuits, logic circuits, microprocessors or controllers from any desired family or manufacturer, and/or software and/or firmware executing on the hardware.

The priming controller 114 of the illustrated example includes a local memory 120 (e.g., a cache). The priming controller 114 of the illustrated example is in communication with a main memory including a volatile memory 122 and a non-volatile memory 124 via a bus 126. The volatile memory 122 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 124 may be implemented by flash memory and/or any other desired type of memory device. Access to the main memory 122, 124 is controlled by a memory controller.

The printer 100 of the illustrated example also includes an interface circuit 128. The interface circuit 128 may be implemented by any type of interface standard, such as an Ethernet interface, a universal serial bus (USB), and/or a PCI express interface.

In the illustrated example, one or more input devices 130 are connected to the interface circuit 128. The input device(s) 130 permit(s) a user to enter data and commands into the priming controller 114. The input device(s) can be implemented by, for example, an image scanner, a keyboard, a button, a mouse, a touchscreen, a track-pad, a trackball, and/or isopoint.

One or more output devices 132 are also connected to the interface circuit 128 of the illustrated example. The output devices 132 can be implemented, for example, by display devices (e.g., a light emitting diode (LED), an organic light emitting diode (OLED), a liquid crystal display, a cathode ray tube display (CRT), a touchscreen), a tactile output device, and/or speakers. The interface circuit 128 of the illustrated example, thus, typically includes a graphics driver card, a graphics driver chip or a graphics driver processor.

The interface circuit 128 of the illustrated example also includes a communication device such as a transmitter, a receiver, a transceiver, a modem and/or network interface card to facilitate exchange of data with external machines (e.g., computing devices of any kind) via a network 134 (e.g., an Ethernet connection, a digital subscriber line (DSL), a telephone line, coaxial cable, a cellular telephone system, etc.).

The printer 100 of the illustrated example also includes one or more storage devices 116 for storing software and/or data. Examples of such mass storage devices 116 include disk drives, hard drive disks, and/or solid state drives.

The coded instructions 136 of FIGS. 8, 9, 10, 11, and/or 12 may be stored in the storage device 116, in the volatile memory 122, in the non-volatile memory 124, and/or on a removable tangible computer readable storage medium such as a CD or DVD.

The example priming controller 114 of FIG. 1 stores data, such as priming parameters, printing parameters, and priming trigger information in storage device(s) 116, the local memory 120, and/or the main memory 122, 124.

While an example manner of implementing the printer 100 is illustrated in FIG. 1, one or more of the elements, processes and/or devices illustrated in FIG. 1 may be combined, divided, re-arranged, omitted, eliminated and/or implemented in any other way. Further, the example acumen storage devices 110C, 110M, 110Y, 110K, the example primer 112, the example priming controller 114, the example ink supply reader 118 and/or, more generally, the example printer 100 of FIG. 1 may be implemented by hardware, software, firmware and/or any combination of hardware, software and/or firmware. Thus, for example, any of the example ink supply reader 118 and/or, more generally, the example printer 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ink supply reader 118 and/or, more generally, the example printer 100 is/are hereby expressly defined to include a tangible computer readable storage device or storage disk such as a memory, a digital versatile disk (DVD), a compact disk (CD), a Blu-ray disk, etc. storing the software and/or firmware. Further still, the example printer 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the printer 100 of FIG. 1 are shown in FIGS. 8, 9, 10, 11, and 12. In this example, the machine readable instructions comprise program(s) for execution by a processor such as the priming controller 114 shown in the example printer 100 discussed above in connection with FIG. 1. The program(s) may be embodied in software stored on a tangible computer readable storage medium such as a CD-ROM, a floppy disk, a hard drive, a digital versatile disk (DVD), a Blu-ray disk, or a memory associated with the priming controller 114, but the entire program(s) and/or parts thereof could alternatively be executed by a device other than the priming controller 114 and/or embodied in firmware or dedicated hardware. Further, although the example programs are described with reference to the flowcharts illustrated in FIGS. 8, 9, 10, 11, and/or 12, many other methods of implementing the example priming controller 114 may alternatively be used. For example, the order of execution of the blocks may be changed, and/or some of the blocks described may be changed, eliminated, or combined.

As mentioned above, the example processes of FIGS. 8, 9, 10, 11, and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium"

and "tangible machine readable storage medium" are used interchangeably. Additionally or alternatively, the example processes of FIGS. 8, 9, 10, 11, and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIGS. 3-6 illustrate example sets of printer parameters during different scenarios of configuring a printer (e.g., the printer 100 of FIG. 1) based on priming parameters obtained from a storage device (e.g., the acumen storage devices 110C, 110M, 110Y) associated with an ink supply (e.g., the ink supplies 106C, 106M, 106Y) of the printer 100.

The examples of FIGS. 3-6 refer to the ink supplies 106C, 106M, 106Y associated with the print head 104C. Because the example ink supply 106K is associated with a separate print head 104K that is not necessarily primed at a same time as the print head 104C (e.g., the priming controller 114 performs priming procedures and/or printer configuration associated with the print head 104K independently from priming procedures and printer configuration associated with the print head 104C), the example priming controller 114 does not use the parameters 202-226 stored in the acumen storage device 110K. However, any or all of the examples of FIGS. 3-6 may also be applied to combinations of ink supplies 106 that include the ink supply 106K.

In the example of FIG. 3, the printer 100 of FIG. 1 has completed an initial priming procedure (e.g., via the priming controller 114 instructing the primer 112 to perform the initial priming procedure). At a first (e.g., initial) time following performance of the initial priming procedure, the priming parameters ape_count_A 208, ape_count_B 210, and ape_total_count 212 parameters and the printer parameters ape_primes_remaining_A, ape_primes_remaining_B, and/or ape_total_count have values shown in part 302 of FIG. 3. In particular, each of the acumen storage devices 110C, 110M, 110Y have an ape_count_A 208 parameter equal to 1, an ape_count_B 210 parameter equal to 1, and an ape_total_count 212 parameter equal to 0. The priming controller 114 has selected one of the acumen storage devices 110C, 110M, 110Y to be representative of the priming parameters for the print head 104C. The parameter values of ape_count_A 208, ape_count_B 210, and ape_total_count 212 are the same for the acumen storage devices 110C, 110M, 110Y, so the value of local parameter ape_primes_remaining_A is equal to 1, the value of ape_primes_remaining_B is equal to 1, and the value of ape_total_count is equal to 0.

At a first time subsequent to the initial time, the example primer 112 performs an A-type acumen-based priming procedure on the print head 104C (e.g., in response to a request and/or a trigger associated with one or more of the ink supplies 106C, 106M, 106Y). Between the initial time and the first A-type priming procedure, a period of time may elapse and/or the print head 104C may generate a number of print impressions. In this example, when the primer 112 performs the A-type priming procedure (e.g., an acumen-based priming procedure), the example priming controller 114 decrements the value of the parameter ape_count_A 208 for each of the associated acumen storage devices 110C, 110M, 110Y (e.g., to a value of 0). The example priming controller 114 of FIG. 1 updates the value of the parameter ape_count_A 208 at the acumen storage devices 110C, 110M, 110Y. As a result, the value of ape_primes_remaining_A is also decremented to 0. The updated values of the priming parameters ape_count_A 208, ape_count_B 210, and ape_total_count 212 and the printer parameters ape_primes_remaining_A, ape_primes_remaining_B, and/or ape_total_count have values shown in part 304 of FIG. 3.

The example priming controller 114 of FIG. 1 also determines a status of the acumen-based priming procedures (e.g., ape_primes_completed) to be '0' (or 'false') because there are still acumen-based priming procedures that may be requested (e.g., one B-type acumen-based priming procedure) according to the priming parameters obtained from the acumen storage devices 110C, 110M, 110Y. The example priming controller 114 of the illustrated example determines a status of the initial priming procedure (e.g., boss_primes_complete) to be '1' (or 'true') because the initial priming procedure was performed on the print head 104C associated with the acumen storage devices 110C, 110M, 110Y. The values of the example printer parameters ape_primes_completed and boss_primes_complete are also included in part 304 of FIG. 3.

At a time subsequent to the A-type priming procedure, the example primer 112 performs a B-type acumen-based priming procedure on the print head 104C (e.g., in response to a request and/or a trigger associated with one or more of the ink supplies 106C, 106M, 106Y). Between the A-type priming procedure and the B-type priming procedure, a period of time may elapse and/or the print head 104C may generate a number of print impressions. Alternatively, the B-type priming procedure may occur immediately following the A-type priming procedure if, for example, the priming controller 114 and/or the primer 112 determine that a different and/or more aggressive priming procedure is needed following completion of the A-type priming procedure, or if the initial priming procedure is to be completed immediately.

When the primer 112 of the illustrated example performs the B-type priming procedure (e.g., an acumen-based priming procedure), the example priming controller 114 of FIG. 1 decrements the value of the parameter ape_count_B 210 in each of the associated acumen storage devices 110C, 110M, 110Y (e.g., to a value of 0). The example priming controller 114 of FIG. 1 updates the value of the parameter ape_count_B 210 at the acumen storage devices 110C, 110M, 110Y. As a result, the value of ape_primes_remaining_B is also decremented to 0. Because there are no more acumen-based priming procedures to be performed based on the values of the count parameters, the example priming controller 114 of this example determines the value of ape_primes_completed to be '1' (or 'true'). The updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 306 of FIG. 3.

Continuing with the example, at a subsequent time, the example ink supply 106M that provides magenta (M)-colored ink to the print head 104C is replaced with a new ink supply 106M having a new acumen storage device 110M.

The ink supply 106M may be replaced (e.g., resulting in a new acumen storage device 110M being installed in the printer 100) rather than refilled (e.g., resulting in the previous acumen storage device 110M remaining in the printer 100) if, for example, an ink having a different chemical formulation is installed. Replacing the acumen storage device 110 does not change the values of the priming parameters ape_count_A 208, ape_count_B 210, or ape_total_count 212 for the other acumen storage devices 110C and 110Y that have not been replaced.

The new acumen storage device 110M has initial priming parameter values of ape_count_A 208=1, ape_count_B 210=1, and ape_total_count 212=0. However, the new acumen storage device 110M also has an initial priming parameter value ape_boss_only 202='true.' Because the ape_boss_only 202 parameter has a value of 'true,' the initial priming procedure has already occurred for the print head 104C associated with the acumen storage device 110M, and the priming parameters associated with the other acumen storage devices 110C and 110Y do not have any acumen-based priming procedures to be performed, the priming controller 114 determines the value of ape_primes_completed to be '1' and configures the printer 100 to disable and/or ignore additional acumen-based priming procedure requests and/or triggers for the print head 104C. The updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 308 of FIG. 3. Thus, the example printer 100 is configured to not perform acumen-based priming procedures after the ink supply 106M is replaced.

FIG. 4 is another example scenario in which the example printer 100 of FIG. 1 may be configured to perform (or not perform) priming procedures. In the example of FIG. 4, the printer 100 performs an initial priming procedure, an A-type priming procedure, and a B-type priming procedure as described above with reference to parts 302-306 of FIG. 3. The resulting updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in respective parts 302, 304, and 306 of FIG. 4, and the descriptions of these parts are not repeated herein.

As in the example of FIG. 3, after the B-type priming procedure is performed, the example ink supply 106M that provides magenta (M)-colored ink to the print head 104C is replaced with a new ink supply 106M which, thus, has a new acumen storage device 110M. In contrast with the example of FIG. 3 described above, the acumen storage device 110M associated with the replacement ink supply 106M in the example of FIG. 4 is configured with a priming parameter ape_boss_only 202 value of '0' or 'false.' Based on the 'false' value of the priming parameter ape_boss_only 202, and the priming parameter values ape_count_A 208=1 and ape_count_B 210=1, the example priming controller 114 determines the value of the ape_primes_completed printer parameter to be '0' or 'false.' Additionally, the priming controller 114 determines the value of the printer parameter ape_total_count to be '0' because the acumen storage device 110M is determined to be representative of the print head 104C (e.g., based on the value of the ape_boss_only 202 parameter of the acumen storage device 110M being 'false,' and/or based on the sums of the values of the ape_count_A 208 and ape_count_B 210 parameters for the acumen storage device 110M being higher than the corresponding sums for the acumen storage devices 110C and 110Y).

Example updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 402 of FIG. 4.

After replacement of the ink supply 106M, the example primer 112 performs a second A-type acumen-based priming procedure on the print head 104C (e.g., in response to a request and/or a trigger associated with one or more of the ink supplies 106C, 106M, 106Y). When the primer 112 performs the second A-type priming procedure (e.g., an acumen-based priming procedure), the example priming controller 114 decrements the value of the parameter ape_count_A 208 for the associated acumen storage device 110M (e.g., to a value of 0). The example priming controller 114 of FIG. 1 updates the value of the parameter ape_count_A 208 at the acumen storage devices 110C, 110M, 110Y. As a result, the value of ape_primes_remaining_A is also decremented to 0.

The example priming controller 114 of FIG. 1 also determines a status of the acumen-based priming procedures (e.g., ape_primes_completed) to be '0' (or 'false') because there are still acumen-based priming procedures that may be requested (e.g., one B-type acumen-based priming procedure) according to the priming parameters obtained from the acumen storage device 110M. Example updated values of the priming parameters ape_count_A 208, ape_count_B 210, and ape_total_count 212 and the printer parameters ape_primes_remaining_A, ape_primes_remaining_B, ape_total_count ape_primes_completed, and boss_primes_complete are shown in part 404 of FIG. 4.

At a time subsequent to the second A-type priming procedure, the example primer 112 performs a second B-type acumen-based priming procedure on the print head 104C (e.g., in response to a request and/or a trigger associated with the ink supply 106M). When the primer 112 of the illustrated example performs the second B-type priming procedure (e.g., an acumen-based priming procedure), the example priming controller 114 decrements the value of the parameter ape_count_B 210 for the associated acumen storage device 110M (e.g., to a value of 0). The example priming controller 114 of FIG. 1 updates the value of the parameter ape_count_B 210 at the acumen storage devices 110C, 110M, 110Y. As a result, the value of ape_primes_remaining_B is also decremented to 0. Because there are no more acumen-based priming procedures to be performed based on the values of the count parameters, the example priming controller 114 determines the value of ape_primes_completed to be '1' (or 'true'). The updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 406 of FIG. 4. Thus, the example printer 100 is configured to not perform acumen-based priming procedures.

FIG. 5 is another example scenario 500 in which the example printer 100 of FIG. 1 may be configured to perform (or not perform) priming procedures. In the example of FIG. 5, the example acumen storage devices 110C, 110M, and 110Y each have a priming parameter ape_boss_only 202 value of 'true.' The example printer 100 performs an initial priming procedure and an A-type priming procedure as described above with reference to parts 302-304 of FIG. 3.

Thus, after the completion of the A-type priming procedure, a boss priming procedure is not yet complete. Example resulting updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in respective parts 302, 304 of FIG. 5, and the descriptions of these parts are not repeated herein.

In the example of FIG. 5, after the A-type priming procedure is performed and before any B-type priming procedures are performed, the example ink supply 106M that provides magenta (M)-colored ink to the print head 104C is replaced with a new ink supply 106M having a new acumen storage device 110M. The acumen storage device 110M in the example of FIG. 5 has an ape_boss_only 202 parameter value of 'true.' The example new acumen storage device 110M also includes priming parameter values of 1 for ape_count_A 208, 1 for ape_count_B 210, and 0 for ape_total_count 212. The example priming controller 114 of FIG. 1 determines the value of ape_primes_completed to be '0' because at least one acumen storage device 110 has a value of at least 1 for ape_count_A 208 and/or ape_count_B 210. Because the boss priming procedure has not yet been completed (e.g., the boss_prime_complete printer parameter has a value of '0'), acumen-based priming procedures may still be performed. Example updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 502 of FIG. 5.

After replacement of the ink supply 106M, the example primer 112 of FIG. 1 performs a B-type acumen-based priming procedure on the print head 104C (e.g., in response to a request and/or a trigger associated with one or more of the ink supplies 106C, 106M, 106Y). When the primer 112 of the illustrated example performs the B-type priming procedure (e.g., an acumen-based priming procedure), the example priming controller 114 decrements the value of the parameter ape_count_B 210 for the associated acumen storage devices 110C, 110M, 110Y (e.g., to respective values of 0). The example priming controller 114 updates the value of the parameter ape_count_B 210 at the acumen storage devices 110C, 110M, 110Y. As a result, the value of ape_primes_remaining_B is also decremented to 0.

Because both an A-type priming procedure and a B-type priming procedure have been performed on the print head 104C, the example priming controller 114 of this example determines the printer parameter boss_prime_complete to be '1.' While there are still acumen-based priming procedures that may be requested (e.g., one A-type acumen-based priming procedure) according to the priming parameters obtained from the acumen storage device 110M, the printer parameter ape_primes_completed is not set to '0.' Instead, the example priming controller 114 of FIG. 1 determines the status of the acumen-based priming procedures (e.g., ape_primes_completed) to be '1' (or 'true') because the acumen storage device 110M has an ape_boss_only 202 parameter value of 'true' and the printer parameter boss_prime_complete is equal to '1,' which overrides any counts left in the acumen-based priming procedure parameters ape_count_A 208 and ape_count_B 210.

Example updated values of the priming parameters ape_count_A 208, ape_count_B 210, and ape_total_count 212 and the printer parameters ape_primes_remaining_A, ape_primes_remaining_B, ape_total_count ape_primes_completed, and boss_primes_complete are shown in part 504 of FIG. 5. Thus, the example printer 100 is configured to not perform acumen-based priming procedures. However, the printer 100 of the illustrated example may be subsequently configured (e.g., in response to a change in an ink supply 106) to perform acumen-based priming procedures.

FIG. 6 is another example scenario 600 in which the example printer 100 of FIG. 1 may be configured to perform (or not perform) priming procedures. In the example of FIG. 6, each of the example acumen storage devices 110C, 110M, and 110Y has a priming parameter ape_boss_only 202 value of 'true.' The example printer 100 performs an initial priming procedure and an A-type priming procedure as described above with reference to parts 302-304 of FIG. 3. Thus, after the completion of the A-type priming procedure, an initial priming procedure is not yet complete. Additionally, in the example of FIG. 6, after the A-type priming procedure is performed and before any B-type priming procedures are performed, the example ink supply 106M that provides magenta (M)-colored ink to the print head 104C is replaced with a new ink supply 106M having a new acumen storage device 110M as described above with reference to FIG. 5. Example resulting updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in respective parts 302, 304, and 502 of FIG. 6, and the descriptions of these parts are not repeated herein. In the example of FIG. 6, the replacement acumen storage device 110M has an ape_boss_only 202 parameter value of 'false.'

After performing the ink supply replacement, the example primer 112 performs a B-type acumen-based priming procedure on the print head 104C (e.g., in response to a request and/or a trigger associated with one or more of the ink supplies 106C, 106M, 106Y). When the primer 112 of the illustrated example performs the B-type priming procedure (e.g., an acumen-based priming procedure), the example priming controller 114 decrements the value of the parameter ape_count_B 210 for the associated acumen storage devices 110C, 110M, 110Y (e.g., to respective values of 0). The example priming controller 114 updates the value of the parameter ape_count_B 210 at the acumen storage devices 110C, 110M, 110Y. As a result, the value of ape_primes_remaining_B is also decremented to 0.

Unlike the example of FIG. 5 (in which the ape_boss_only parameter of the replacement acumen storage device 110M is 'true'), in the example of FIG. 6 the acumen storage device 110M is used as the representative acumen storage device. As a result, the values of the printer parameters ape_primes_remaining_A, ape_primes_remaining_B, and ape_total_count match the respective values of the priming parameters ape_count_A 208, ape_count_B 210, and ape_total_count 212. Additionally, the priming controller 114 determines the value of the ape_primes_completed printer parameter to be '0' or 'false,' because the acumen storage device 110M may request another acumen-based priming procedure to be performed.

The example priming controller 114 of FIG. 1 further determines the value of the boss_primes_complete parameter to be '0' or 'false' because both the B-type priming procedure has not been performed for the ink supply 106M (though both the A-type and the B-type priming procedures have been performed in association with the ink supplies 106C and 106Y). Example updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 602 of FIG. 6.

After the B-type priming procedure is performed, the example primer 112 of FIG. 1 performs a second A-type priming procedure on the print head 104C. The second A-type priming procedure is an acumen-based priming procedure that may be requested, for example, based on a watchdog associated with the ink supply 106M. Because the value of the ape_boss_only parameter 202 of the replacement acumen storage device 110M is 'false,' the configuration of the printer 100 permits the second A-type priming procedure to be performed.

When the primer 112 of the illustrated example performs the second A-type priming procedure, the example priming controller 114 decrements the value of the parameter ape_count_A 208 for the associated acumen storage devices 110C, 110M, 110Y (e.g., to respective values of 0). However, the value of the parameter ape_count_A 208 for the associated acumen storage devices 110C and 110Y were previously set to 0 and may remain at 0. The priming controller 114 of the illustrated example also increments the values of the ape_total_count 212 parameter for each of the acumen storage devices 110C, 110M, 110Y, because the priming procedure was performed on the print head 104C associated with all of the acumen storage devices 110C, 110M, 110Y. The example priming controller 114 updates the value of the parameter ape_count_A 208 at the acumen storage devices 110C, 110M, 110Y. The priming controller 114 also decrements the value of ape_primes_remaining_A to 0.

Because, in this example, there are no additional acumen-based priming procedures to be performed based on the priming parameters stored in the acumen storage devices 110C, 110M, 110Y, the example priming controller 114 sets the value of ape_primes_completed to '1' or 'true.' Example updated values of the priming parameters ape_count_A 208, ape_count_B 210, and ape_total_count 212 and the printer parameters ape_primes_remaining_A, ape_primes_remaining_B, ape_total_count, ape_primes_completed, and boss_primes_complete are shown in part 604 of FIG. 6. Thus, the example printer 100 is configured to not perform acumen-based priming procedures.

FIG. 7 is a table 700 illustrating example scenarios for selecting a representative acumen storage device (e.g., from the acumen storage devices 110C, 110M, 110Y) and/or set of priming parameters (e.g., priming parameters 202-226 of FIG. 2) for a print head (e.g., the print head 104C associated with the acumen storage devices 110C, 110M, 110Y).

As discussed above with reference to FIG. 1, the example priming controller 114 determines the representative acumen storage device 110 from multiple acumen storage devices 110C, 110M, 110Y by: a) selecting one of the acumen storage devices 110 that is the only one of the possible acumen storage devices 110 that has a priming parameter ape_boss_only 202 value of 'false,' and/or b) when multiple acumen storage devices 110 that have a priming parameter ape_boss_only 202 value of 'false,' selecting the one of the acumen storage devices 110 that has a highest sum of the values for priming parameters ape_count_A+ape_count_B.

Prior to a first time, the printer 100 of FIG. 1 has completed the boss priming procedure. At the first time, as represented by table 702, a set of ink supplies 106C (C), 106M (M), 106Y (Y), 106K (K) are installed in the printer 100. The values of respective ape_boss_only 202 priming parameters and the values of the respective ape_count_A 208 and ape_count_B 210 associated with the ink supplies 106C, 106M, 106Y, 106K, as well as the sum of these parameters, are shown in the table 702. The example priming controller 114 selects the acumen storage device 110Y to be the representative acumen storage device 110 because it is the only acumen storage device to have a value of 'false' for its ape_boss_only 202 priming parameter.

At a second time, represented by table 704, the ink supply 106C is replaced with a first replacement ink supply 106C having a first replacement acumen storage device 110C. The first replacement acumen storage device 110C has a value of 'false' for its ape_boss_only 202 priming parameter and the values of ape_count_A 208=2 and ape_count_B 210=1. The example priming controller 114 selects the acumen storage device 110C to be the representative acumen storage device 110 because, while both the acumen storage devices 110C and 110Y have a value of 'false' for their respective ape_boss_only 202 priming parameters, the example acumen storage device 110C has a higher sum of values of ape_count_A 208 and ape_count_B 210 than the acumen storage device 110Y.

At a third time, represented by table 706, the ink supply 106M is replaced with a second replacement ink supply 106M having a first replacement acumen storage device 110M. The second replacement acumen storage device 110M has a value of 'true' for its ape_boss_only 202 priming parameter and the values of ape_count_A 208=2 and ape_count_B 210=2. The example priming controller 114 continues to select the acumen storage device 110C to be the representative acumen storage device 110 because, while the acumen storage device 110M has a higher sum of values of ape_count_A 208 and ape_count_B 210 than either of the acumen storage devices 110C and 110Y, the second replacement acumen storage device 110M has a value of 'true' for its ape_boss_only 202, which prevents the example priming controller 114 from selecting it. The example priming controller 114 selects the acumen storage device 110C over the acumen storage device 110Y for the reasons described above with reference to table 704.

At a fourth time, represented by table 708, the ink supply 106C is again replaced with a third replacement ink supply 106C having a third replacement acumen storage device 110C. In contrast to the first replacement acumen storage device 110C, the third replacement acumen storage device 110C has a value of 'true' for its ape_boss_only 202 priming parameter. The third replacement acumen storage device 110C also has values of ape_count_A 208=2 and ape_count_B 210=1. As shown in table 708, the example priming controller 114 selects the acumen storage device 110Y to be the representative acumen storage device 110 because it is again the only acumen storage device to have a value of 'false' for its ape_boss_only 202 priming parameter.

During the first, second, third, and fourth times illustrated in tables 702-708, the black ink acumen storage device 110K is also selected, because the black ink supply 106K is connected to a different print head 104K than the print head 104C. The print head 104K may undergo priming procedures separately from the print head 104C.

At a fifth time, represented by table 710, the ink supplies 106Y and 106K are replaced with respective replacement ink supplies 106Y and 106K having respective acumen storage devices 110Y and 110K. Both of the replacement acumen storage devices 110C 110Y and 110K have a value of 'true' for their respective ape_boss_only 202 priming parameters. As a result, all of the acumen storage devices 110C, 110M, 110Y and 110K have values of 'true' for their respective ape_boss_only 202 priming parameters. The example priming controller 114 selects the acumen storage devices 110Y and 110K because the acumen storage devices 110Y and 110K were the previously-selected storage devices. Additionally, because all of the acumen storage devices 110C, 110M, 110Y and 110K have values of 'true' for their respective ape_boss_only 202 priming parameters, none of the acumen storage devices 110C, 110M, 110Y and 110K have priming parameters to justify selecting a different representative acumen storage device 110.

Figure 8:
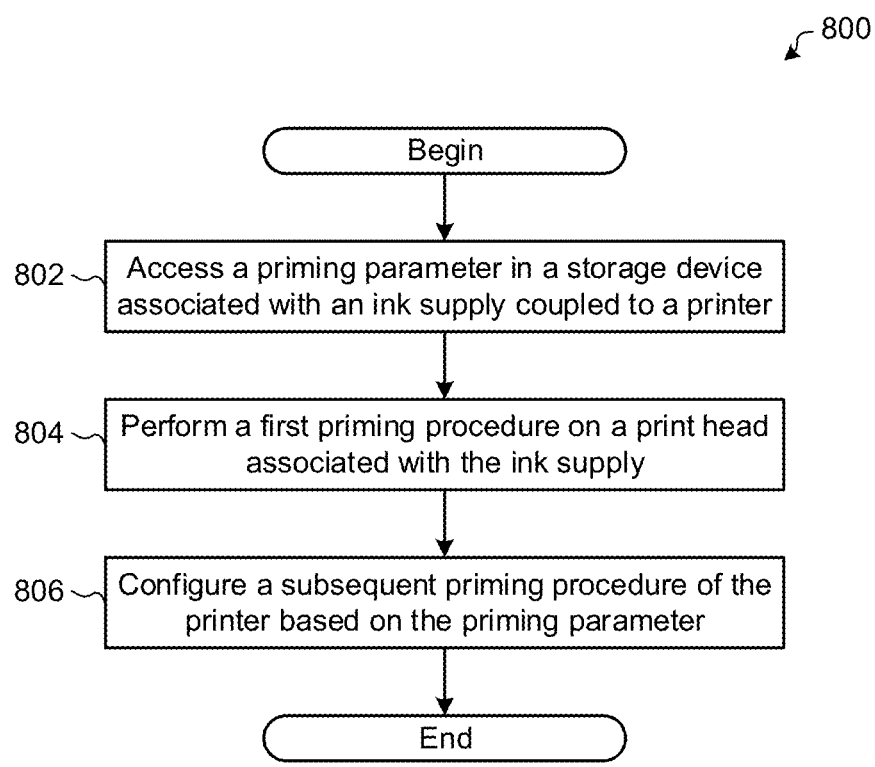
FIG. 8 is a flowchart representative of example machine readable instructions which may be executed to configure a printer based on priming parameters obtained from a storage device associated with an ink supply constructed in accordance with the teachings of this disclosure.

FIG. 8 is a flowchart representative of example machine readable instructions 800 which may be executed to configure a printer (e.g., the printer 100 of FIG. 1) based on priming parameters obtained from a storage device (e.g., the acumen storage devices 110) associated with an ink supply (e.g., the ink supplies 106). The example instructions 900 may be performed by the priming controller 114 of FIG. 1.

The example priming controller 114 accesses a priming parameter in a storage device associated with an ink supply coupled to a printer (block 804). For example, the priming controller 114 may access a priming parameter 202-226 of FIG. 2 stored in an acumen storage device 110 of FIG. 1 via the ink supply reader 118.

The example primer 112 performs a first priming procedure on a print head associated with the ink supply (block 804). For example, the priming controller 114 may instruct the primer 112 to perform the first priming procedure, such as an A-type or B-type priming procedure (or any other priming procedure), on one or more of the print head(s) 104 of FIG. 1.

The example priming controller 114 configures a subsequent priming procedure of the printer 100 based on the priming parameter (block 806). For example, the priming controller 114 may configure the printer 100 to perform a subsequent priming procedure in response to a trigger based on the first priming parameter (e.g., if an ape_boss_only 202 parameter value is set to 'false'). In some other examples, the priming controller 114 may configure the printer 100 to not perform subsequent priming procedures on one or more print heads 104 based on the first priming parameter (e.g., if an ape_boss_only 202 parameter value is set to 'true'). The example instructions 800 then end.

Figure 9:
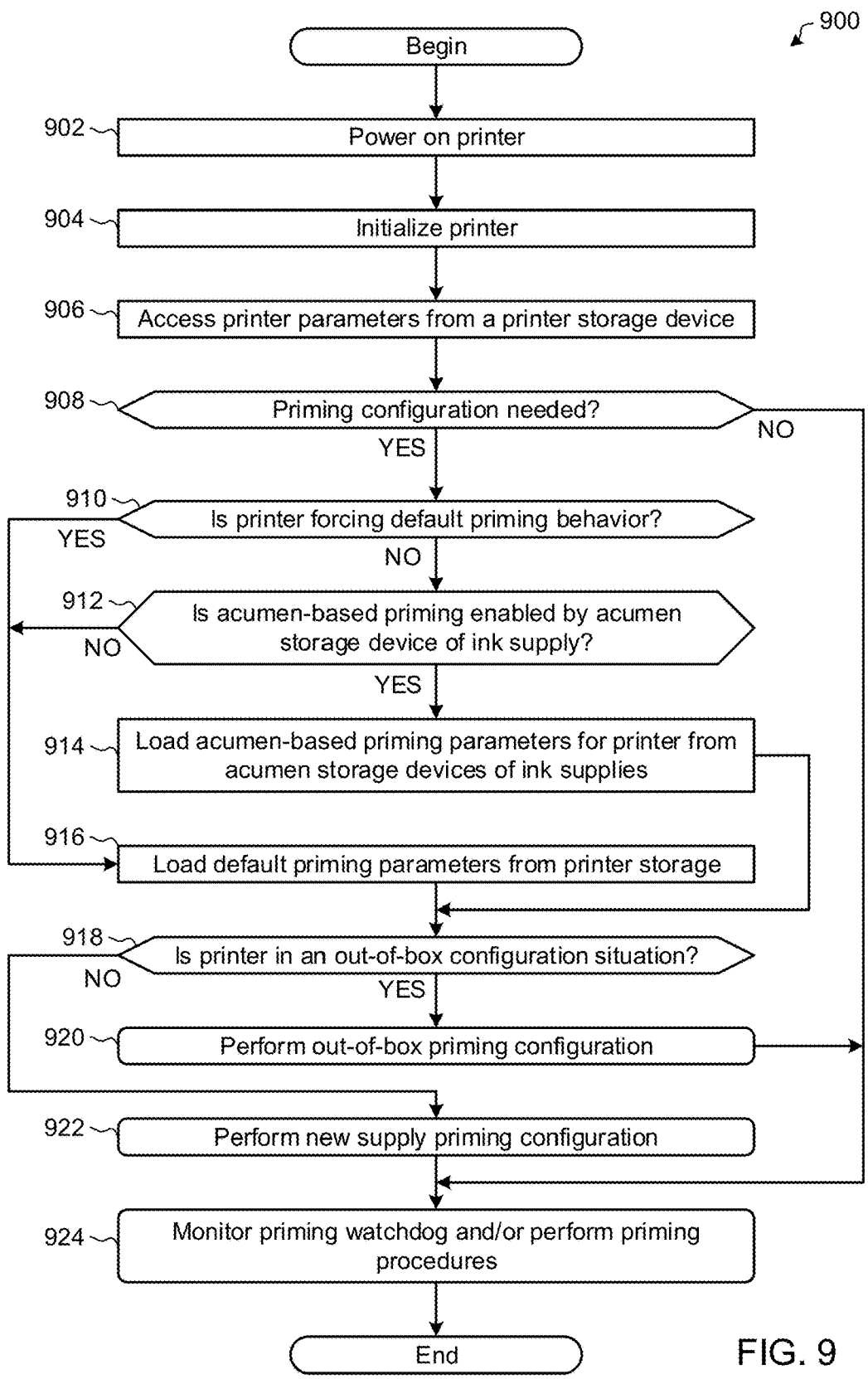
FIG. 9 is a flowchart representative of example machine readable instructions which may be executed to configure a printer based on priming parameters obtained from a storage device associated with an ink supply constructed in accordance with the teachings of this disclosure.

FIG. 9 is a flowchart representative of example machine readable instructions 900 which may be executed to configure a printer (e.g., the printer 100 of FIG. 1) based on priming parameters obtained from a storage device (e.g., the acumen storage devices 110) associated with an ink supply (e.g., the ink supplies 106) of the printer 100. The example instructions 900 may be performed by the priming controller 114 of FIG. 1.

The example printer 100 is powered on (e.g., plugged in or turned on) (block 902). When the printer 100 turns on, the example printer 100 performs an initialization process (block 904). The initialization process may, for example, check the status of different aspects of the printer 100 to prepare the printer 100 to receive and perform print jobs. In some examples, the initialization process may include determining whether the print heads 104 are primed for use (e.g., have ink available for jetting) and/or checking the acumen storage devices 110 for proper communication.

After or as part of the initialization process, the example priming controller 114 accesses printer parameters from a storage device 116, 122, 124 of the printer 100 (block 906). For example, the priming controller 114 accesses a boss_primes_complete parameter (e.g., indicating whether an initial boss prime has been completed for one or more print heads 104) and/or a default priming behavior parameter (e.g., indicating whether acumen-based priming is to be supported or enabled by the printer 100).

The example priming controller 114 determines whether priming configuration is needed for the printer 100 (block 908). Priming configuration of the printer 100 may be needed if, for example, the boss_primes_complete printer parameter indicates that an initial priming procedure has not been completed for one or more print heads 104. If priming configuration is needed (block 908), the example priming controller 114 determines whether the printer 100 is forcing default priming behavior (e.g., disabling acumen-based priming via the printer parameters) (block 910). Default priming behavior may include configuration instructions coded into the firmware or software of the printer 100, or otherwise does not rely on information obtained from the acumen storage devices 110.

If the printer 100 is not forcing default priming behavior (block 910), the example priming controller 114 determines whether acumen-based priming is enabled by the acumen storage device 110 of one or more ink supplies 106 (block 912). For example, the ink supply reader 118 may access the ape_disable 204 parameter of FIG. 2 in the acumen storage devices 110, from which the priming controller 114 determines whether any of the acumen storage devices 110 have disabled acumen-based priming.

If acumen-based priming is enabled by the acumen storage devices 110 (block 912), the example priming controller 114 loads the acumen-based priming parameters 202-226 for the printer 100 from the acumen storage devices 110 of the ink supplies 106 (e.g., via the ink supply reader 118) (block 914). On the other hand, if the printer 100 is forcing default priming behavior (block 910) or the acumen-based priming is not enabled by the acumen storage devices 110 (block 912), the example priming controller 114 loads default priming parameters for the printer 100 from a storage device 116, 122, 124 (block 916).

After loading the acumen-based priming parameters (block 914) or the default priming parameters (block 916), the example priming controller 114 determines whether the printer 100 is in an out-of-box configuration situation (block 918). For example, the priming controller 114 may determine whether the printer 100 has been previously configured or set up based on an out-of-box setting stored in storage device 116, 122, 124.

If the printer 100 is in an out-of-box configuration situation (block 918), the example priming controller 114 performs an out-of-box priming configuration (block 920). Performing an out-of-box priming configuration may include, for example, performing one or more priming procedures and configuring subsequent acumen-based priming procedures of the printer 100. Example instructions to perform the out-of-box priming configuration are described below with reference to FIG. 10.

If the printer 100 is not in an out-of-box configuration situation (block 918), the example priming controller 114 performs a new supply priming configuration (block 922). For example, the priming controller 114 may check to determine whether any new ink supplies 106 are present and/or configure subsequent priming procedures of the printer 100 based on the new ink supplies 106. Example instructions to perform the new supply priming configuration are described below with reference to FIG. 11.

After performing the new supply priming configuration (block 922) or performing the out-of-box priming configuration (block 920), or if priming configuration is not needed (e.g., no changes have occurred since a previous occurrence of the printer being on) (block 908), the example priming controller 114 permits the printer 100 to enter a steady state (e.g., a ready state in which the printer 100 may receive and execute print jobs) (block 924).

The example instructions 900 then end. The instructions 900 of FIG. 9 may be performed each time the printer 100 is powered on to determine whether any priming configuration is needed (e.g., due to changes in an ink supply).

Figure 10:
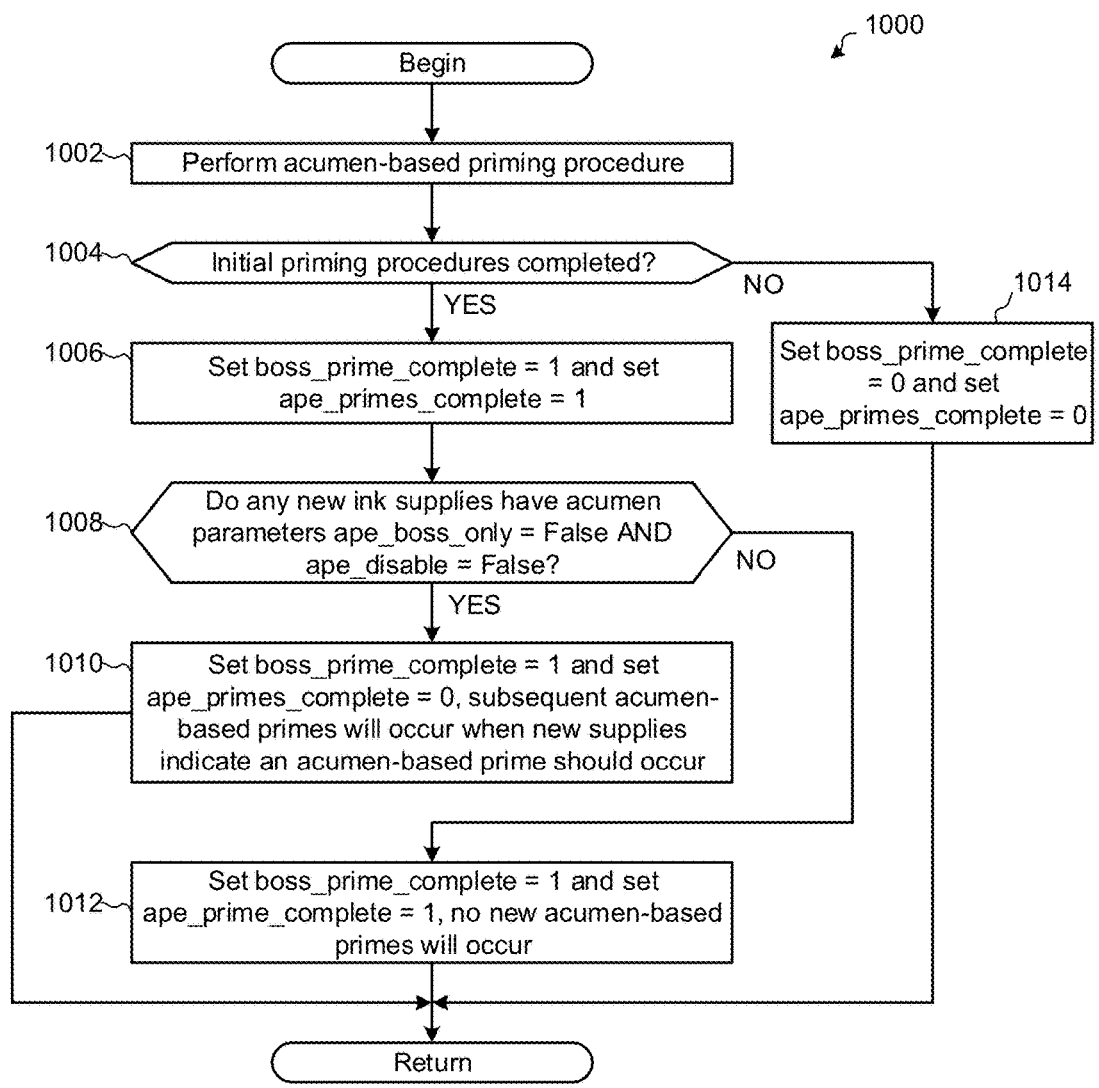
FIG. 10 is a flowchart representative of example machine readable instructions which may be executed to perform an out-of-box priming configuration of a printer based on priming parameters obtained from a storage device associated with an ink supply constructed in accordance with the teachings of this disclosure.

FIG. 10 is a flowchart representative of example machine readable instructions 1000 which may be executed by the priming controller 114 of FIG. 1 to perform an out-of-box priming configuration of the printer 100. The example instructions 1000 may be executed to implement block 920 of FIG. 9 to perform an out-of-box priming configuration. The instructions 1000 enter from block 918 of FIG. 9.

The example priming controller 114 instructs the primer 112 to perform an acumen-based priming procedure for the print head(s) 104 (block 1002). The example priming procedure is an initial priming procedure that places the print head(s) 104 in a condition in which the print head(s) 104 can print in response to a print command (e.g., by providing ink from the ink supplies 106 to the print head(s) 104). In some examples, the acumen-based priming procedure performed in block 1002 may be less than a full or complete priming procedure to prepare the printer for long-term or full-performance use.

The example priming controller 114 determines whether the initial priming procedure has been completed (block 1004). For example, the initial priming procedure may be considered to be completed if a full or complete priming procedure has been completed to prepare the printer for long-term or full-performance use, but only partially or not completed if partial priming procedure has been completed. In some examples, performance of the A-type priming procedure is considered a partially completed priming procedure, while performance of both the A-type and B-type priming procedures is considered a fully completed priming procedure.

If the initial priming procedure has been completed (e.g., fully completed) (block 1004), the example priming controller 114 sets both boss_prime_complete printer parameter and an ape_primes_completed printer parameter to '1' or 'true' (block 1006). For example the priming controller 114 may store the values of the boss_prime_complete and ape_primes_completed printer parameters in the storage device 116.

The example priming controller 114 determines whether any ink supplies 106 have acumen storage devices 110 with parameter values of 'false' or '0' for both priming parameters ape_boss_only 202 and ape_disable 204 (block 1008). If any ink supplies 106 have acumen storage devices 110 with parameter values of 'false' or '0' for priming parameters ape_boss_only 202 and ape_disable 204 (block 1008), the example priming controller 114 sets the boss_prime_complete printer parameter to 'true' or '1' and sets the ape_primes_completed printer parameter to 'false' or '0' (block 1010). As a result, the printer 100 is configured such that subsequent acumen-based priming procedures will occur when new (e.g., replacement) ink supplies indicate that an acumen-based priming procedure should occur. For example, the printer 100 may be configured to respond to time-based and/or usage-based triggers associated with (e.g., determined from) priming parameters 202-226 in the acumen storage devices 110.

On the other hand, if no ink supplies 106 have acumen storage devices 110 with parameter values of 'false' or '0' for priming parameters ape_boss_only 202 and ape_disable 204 (block 1008), the example priming controller 114 sets the boss_prime_complete printer parameter to a value of 'true' or '1' and sets the ape_primes_completed printer parameter to a value of 'true' or '1' (block 1012). Because all of the acumen storage devices 110 are set to ape_boss_only='true' or '1' and/or ape_disable='true' or '1,' no acumen-based priming procedures will be performed by the printer 100. However, the printer 100 may be subsequently configured to perform acumen-based priming procedures at a later time (e.g., if any of the ink supplies 106 are replaced with an acumen storage device 110 (e.g., associated with an ink supply 106) storing priming parameter values of 'false' or '0' for priming parameters ape_boss_only 202 and ape_disable 204, and which further causes the printer 100 to set the ape_primes_completed parameter to 'false' or '0.'

Returning to block 1004, if the initial priming procedures have not been completed (block 1004), the example priming controller 114 sets the boss_prime_complete printer parameter and the ape_primes_completed printer parameter to respective values of 'false' or '0' (block 1014). Accordingly, subsequent acumen-based priming procedures may be performed until, for example, the boss_prime_complete printer parameter and the ape_primes_completed printer parameter to respective values of 'true' or '1.'

After configuring the printer 100 by setting the boss_prime_complete printer parameter and the ape_primes_completed printer parameter to the appropriate value(s) in block 1010, 1012, or 1014, the example instructions 1000 of FIG. 10 end and the priming controller 114 returns control to block 924 of FIG. 9.

Figure 11:
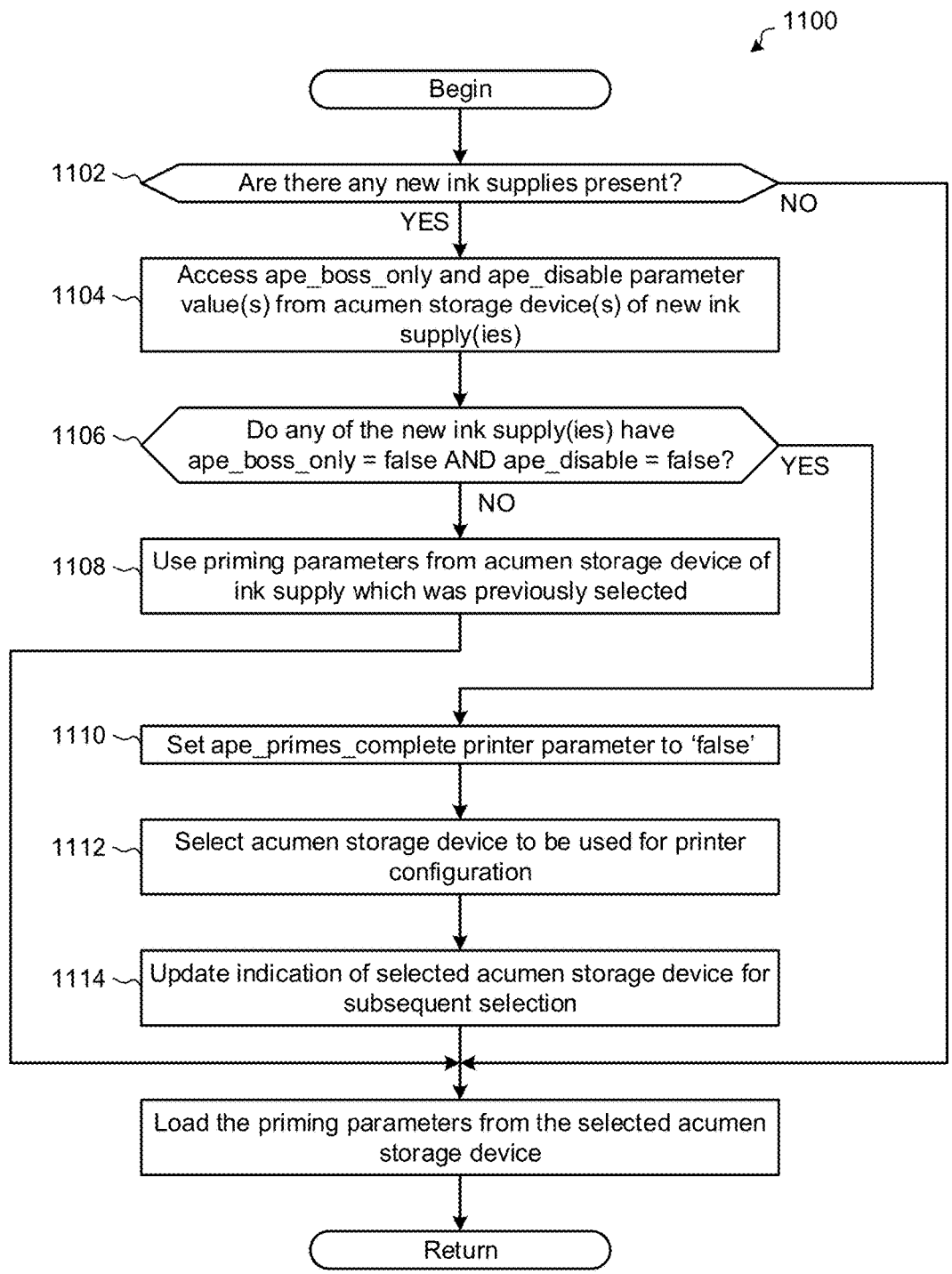
FIG. 11 is a flowchart representative of example machine readable instructions which may be executed to perform a priming configuration for a new ink supply installation of a printer based on priming parameters obtained from a storage device associated with an ink supply constructed in accordance with the teachings of this disclosure.

FIG. 11 is a flowchart representative of example machine readable instructions 1100 which may be executed to perform a priming configuration for a new ink supply installation of the printer 100 of FIG. 1 (e.g., a replacement ink supply) based on priming parameters (e.g., the priming parameters 202-226 of FIG. 2) obtained from a storage device (e.g., in the acumen storage device 110) associated with an ink supply (e.g., the ink supply 106). The example instructions 1200 may be executed by the example priming controller 114 of FIG. 1 to implement the example block 922 of FIG. 9.

The example priming controller 114 determines whether there are any new (e.g., replacement) ink supplies 106 present in the printer 100 (block 1102). For example, the priming controller 114 may compare one or more parameters (e.g., serial number, model number, etc.) in the acumen storage device 110 of each ink supply 106 to one or more stored parameters to identify a difference between the stored parameter(s) and the accessed parameter(s).

If there are new (e.g., replacement) ink supplies present (block 1102), the example priming controller 114 accesses the ape_boss_only 202 and ape_disable 204 parameter values from the acumen storage device(s) of the new ink supply(ies) 110 (block 1104). The priming controller 114 determines whether any of the new ink supply(ies) 110 have values of 'false' for both of the ape_boss_only 202 and ape_disable 204 parameters (block 1106). If none of the new ink supply(ies) 110 have values of 'false' for both of the ape_boss_only 202 and ape_disable 204 parameters (block 1106), the example priming controller 114 accesses priming parameters from an acumen storage device 110 of an ink supply 106 which was previously selected (block 1108). For example, the priming controller 114 may look up a stored indicator of a representative acumen storage device 110 in the printer storage device 116 and load into memory for use in configuring the printer 100.

If any of the new ink supply(ies) 110 have values of 'false' for both of the ape_boss_only 202 and ape_disable 204 parameters (block 1106), the example priming controller 114 sets the ape_primes_completed printer parameter to 'false' (block 1110). The priming controller 114 selects one of the acumen storage devices 110 to be used for printer configuration (block 1112). For example, the priming controller 114 may select the acumen storage device 110 by: a) selecting one of the acumen storage devices 110 that is the only one of the possible acumen storage devices 110 that has a priming parameter ape_boss_only 202 value of 'false,' and/or b) when multiple acumen storage devices 110 have a priming parameter ape_boss_only 202 value of 'false,' selecting the one of the acumen storage devices 110 that has a highest sum of the values for priming parameters ape_count_A+ape_count_B. The example priming controller 114 updates the indication of the selected acumen storage device 110 for subsequent selection (e.g., in a subsequent execution of block 1108).

After selecting the priming parameters (block 1108) or updating the indication of the selected acumen storage device (block 1114), the example priming controller 114 loads the priming parameters from the selected (or previous) acumen storage device (block 1116). For example, the priming controller 114 may access the priming parameters 202-226 via the ink supply reader 118 and load the priming parameters 202-226 into the memory (e.g., in an array). The example priming controller 114 ends the instructions 1100 and returns control to block 924 of FIG. 9.

Figure 12:
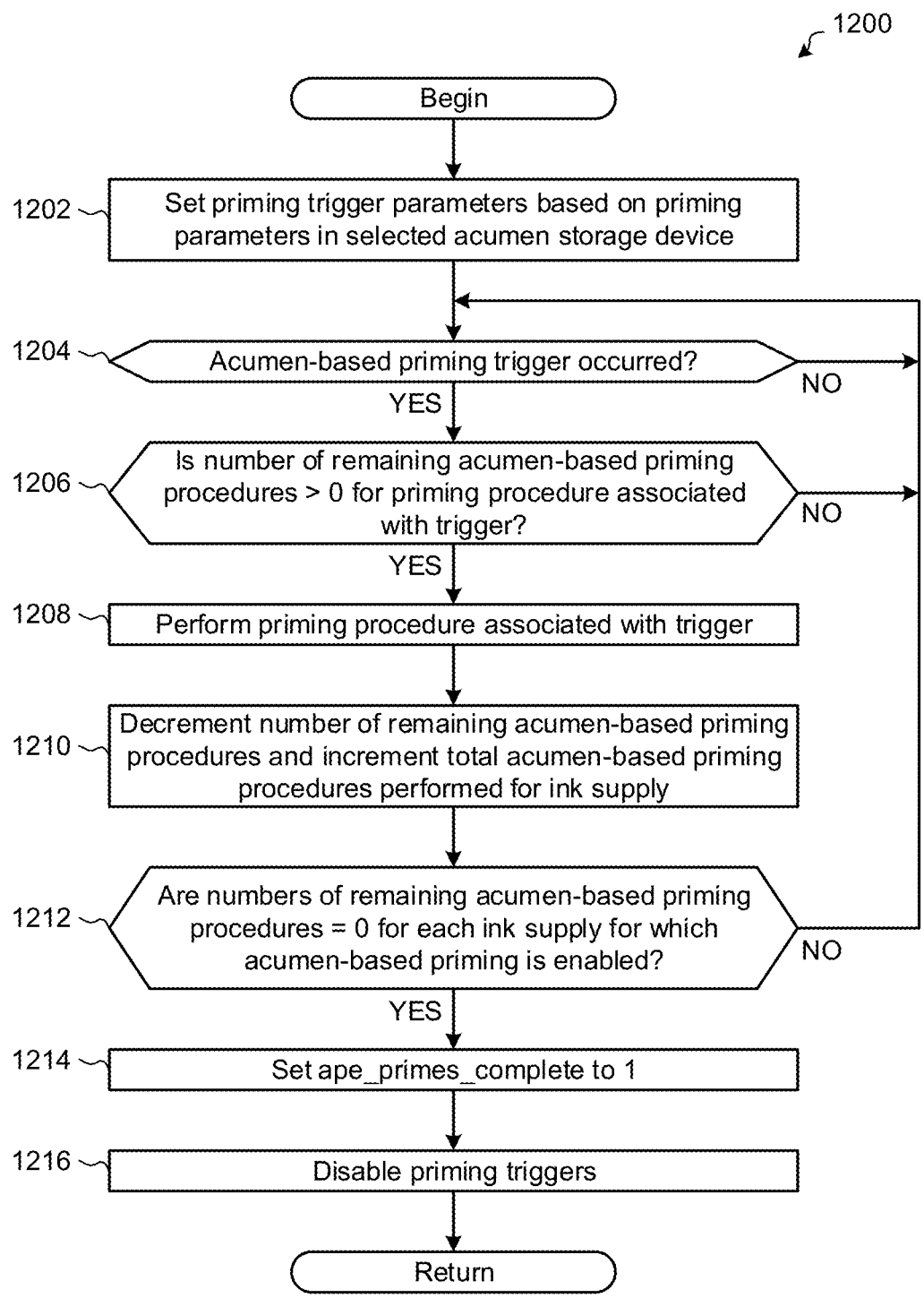
FIG. 12 is a flowchart representative of example machine readable instructions which may be executed to monitoring a priming watchdog and/or perform priming procedures.

FIG. 12 is a flowchart representative of example machine readable instructions 1200 which may be executed by the priming controller 114 of FIG. 1 to monitoring a priming watchdog and/or perform priming procedures. The example instructions 1200 may be executed to implement the example block 924 of FIG. 9 to monitor a priming watchdog and/or perform priming procedures.

The example priming controller 114 of FIG. 1 sets priming trigger parameters based on priming parameters in the selected acumen storage device 110 (block 1202). For example, the priming controller 114 may set one or more time-based priming trigger(s) (e.g., for different types of priming procedures), one or more usage based priming trigger(s) (e.g., for the different types of priming procedures), and/or one or more pre-job triggers (e.g., based on an age of the selected ink supply 106). The priming controller 114 sets the triggers based on priming parameters such as ape_time_trigger_A 214, ape_time_trigger_B 216, ape_usage_trigger_A 218, ape_usage_trigger_B 220, ape_prejob_bypass_1 222, ape_prejob_bypass_2 224, and/or ape_supply_age_switch 226.

The example priming controller 114 determines whether an acumen-based priming trigger has occurred (block 1204). If an acumen-based priming trigger has not occurred (block 1204), control returns to block 1204 to continue monitoring. When an acumen-based priming trigger occurs (block 1204), the example priming controller 114 determines whether a number of remaining acumen-based priming procedures is greater than 0 for the priming procedure associated with the trigger (block 1206). For example, if an A-type priming trigger occurs, the priming controller 114 may access the ape_count_A 208 parameter to determine whether the value is more than 0. If the value of the parameter is not more than 0 (block 1206), control returns to block 1204 to continue monitoring. In some examples, the priming controller 114 configures the printer 100 to disable triggers associated with priming procedures for which the count parameter is 0, and omits block 1206.

If the number of remaining acumen-based priming procedures is greater than 0 for the priming procedure associated with the trigger (block 1206), the example primer 112 performs the priming procedure associated with the trigger (block 1208). For example, if an A-type priming trigger occurs, the priming controller 114 may instruct the primer 112 to perform an A-type priming procedure. The priming controller 114 decrements the number of remaining acumen-based priming procedures (e.g., the count parameter associated with the performed priming procedure, such as ape_count_A 208 or ape_count_B 210) and increments a number of total acumen-based priming procedures performed for the ink supply 106 (e.g., the ape_total_count 212 parameter) (block 1210).

The priming controller 114 determines whether the numbers of remaining acumen-based priming procedures is 0 for each of the ink supplies for which acumen-based priming is enabled (block 1212). For example, the priming controller 114 may determine whether the sum of the values of ape_count_A 208 or ape_count_B 210 is equal to 0 for each of the ink supplies 106. If the numbers of remaining acumen-based priming procedures is not 0 for at least one of the ink supplies for which acumen-based priming is enabled (block 1212), control returns to block 1204 to continue monitoring for priming triggers.

When the number of remaining acumen-based priming procedures is 0 for each of the ink supplies for which acumen-based priming is enabled (block 1212), the example priming controller 114 sets the ape_primes_completed printer parameter to 1 (block 1214). Setting the ape_primes_completed printer parameter to 1 signals that no acumen-based priming procedures are expected to be requested for the printer 100. The priming controller 114 also disables the priming triggers (block 1216). Disabling the priming triggers may eliminate requests (e.g., interrupts) to perform priming procedures. The example priming controller 114 ends the instructions 1200 and returns control to FIG. 9.

At any time during execution of any of the example instructions of FIGS. 8, 9, 10, 11, and/or 12, a loss of power to the printer 100 may occur, causing an interruption of execution. If power to the printer 100 is re-established, the example priming controller 114 restarts execution at block 802 of the example instructions 800 of FIG. 8 or block 902 of the example instructions 900 of FIG. 9.

Figure 13:
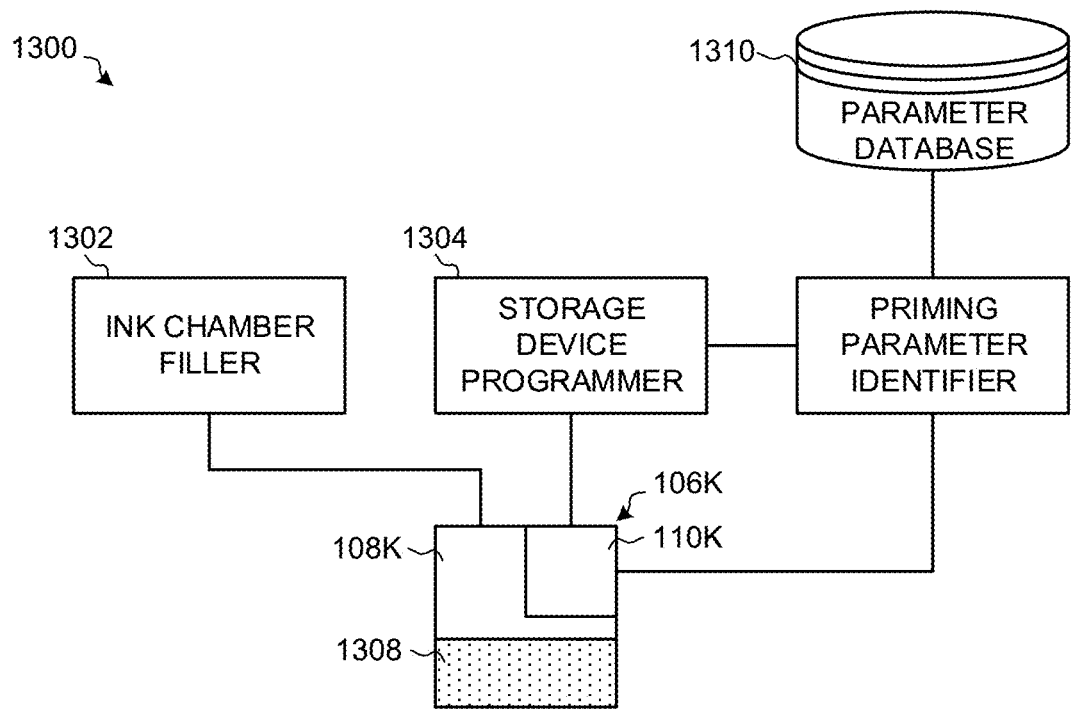
FIG. 13 is an example system to prepare an ink supply constructed in accordance with the teachings of this disclosure.

FIG. 13 is an example system 1300 to prepare an ink supply, such as the ink supplies 106 of FIG. 1. The example system 1300 may be part of ink supply manufacturing and/or refurbishing process(es). The description below refers to one of the ink supplies 106K of FIG. 1, including the ink chamber 108K and the acumen storage device 110K. However, the example system 1300 may additionally or alternatively be applied to any of the ink supplies 106C, 106M, and/or 106Y of FIG. 1.

The example system 1300 of FIG. 13 includes an ink chamber filler 1302, a storage device programmer 1304, and a priming parameter identifier 1306. The example ink chamber filler 1302 fills the ink chamber 108 of FIG. 13 with ink 1308. As used herein, the term "filling," particularly when referring to filling the ink chamber 108K with ink, may but does not necessarily refer to filling the ink chamber 108K to capacity. Instead, filling the ink chamber 108K with ink may refer to filling the ink chamber 108K to some level that is less than full capacity and/or simply to putting ink into the ink chamber 108K.

The example storage device programmer 1304 programs one or more priming parameter values into the acumen storage device 110K. For example, the storage device programmer 1304 may include one or more electrical contacts to make contact with respective contacts of the acumen storage device 110K. The example storage device programmer 1304 then communicates the data to be stored in accordance with a type or structure of the acumen storage device 110K. For example, the storage device programmer 1304 may apply a "write" voltage higher than a "read" voltage to write data to the acumen storage device 110K.

The example priming parameter identifier 1306 identifies a type of acumen storage device 110K, a type of ink supply 106K, and/or a type of ink 1308 being filled in the ink chamber 108K. Based on the identified type(s), the example priming parameter identifier 1306 looks up an appropriate set of priming parameters in a parameter database 1310 and provides the parameter data to the storage device programmer 1304 for programming to the acumen storage device 110K. For example, the priming parameter identifier 1306 may look up initial values for the priming parameters 202-226 of FIG. 2 and provide the initial values to the storage device programmer 1304.

While an example manner of implementing the system 1300 is illustrated in FIG. 13, one or more of the elements, processes and/or devices illustrated in FIG. 13 may be combined, divided, re-arranged, omitted, eliminated and/or implemented in any other way. Further, the example ink chamber filler 1302, the example storage device programmer 1304, the example priming parameter identifier 1306 and/or, more generally, the example system 1300 of FIG. 13 may be implemented by hardware, software, firmware and/or any combination of hardware, software and/or firmware. Thus, for example, any of the example ink chamber filler 1302, the example storage device programmer 1304, the example priming parameter identifier 1306 and/or, more generally, the example system 1300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ink chamber filler 1302, the example storage device programmer 1304, the example priming parameter identifier 1306 and/or, more generally, the example system 1300 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 1300 of FIG. 13 may include one or more elements, processes and/or devices in addition to, or instead of, those illustrated in FIG. 13, and/or may include more than one of any or all of the illustrated elements, processes and devices.

Figure 14:
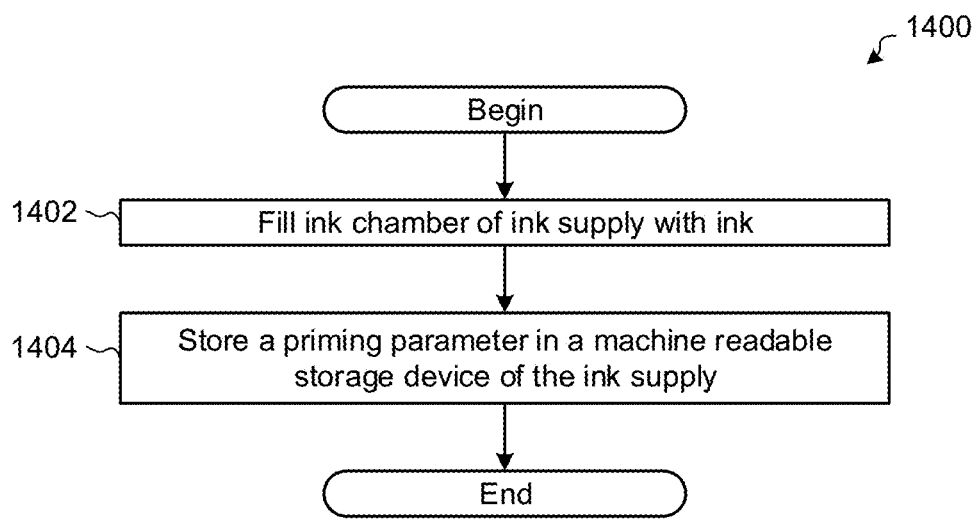
FIG. 14 is a flowchart representative of an example method to prepare an ink supply constructed in accordance with the teachings of this disclosure.

FIG. 14 is a flowchart representative of an example method 1400 to prepare an ink supply, such as the ink supplies 106 of FIG. 1. The example method 1400 may be used on ink supplies that have an ink chamber (e.g., to hold ink) such as the ink chambers 108 of FIG. 1, and a machine readable storage device, such as the acumen storage devices 110 (or acumen chip). The example method 1400 of FIG. 14 may be used during (e.g., as a part of) manufacturing and/or refurbishment of an ink supply. The example method 1400 may be performed by the system 1300 of FIG. 13.

The example method 1400 includes filling an ink chamber (e.g., the ink chamber 108K of FIG. 1) of an ink supply (e.g., the ink supply 106K of FIG. 1) with ink (block 1402).

The example method 1400 further includes storing a priming parameter in a machine readable storage device of the ink supply (block 1404). For example, the storage device programmer 1304 of FIG. 13 may be communicatively coupled to the acumen storage device 110 to program initial values of the parameters 202-226 of FIG. 2 in the acumen storage device 110. Storing the priming parameter in the acumen storage device 110 overwrites any previous values that may have been stored for the priming parameter in the acumen storage device 110. Thus, the storing the priming parameter may be used to reset a number of priming procedures that have been performed in association with the ink supply 106 and/or a number of priming procedures to be performed in association with the ink supply 106. The example method 1400 then ends.

Example ink supplies and methods to prepare ink supplies disclosed herein enable a larger degree of flexibility when designing ink for inkjet printers. Flexibility in designing ink arises from the ability to select and/or program priming parameters for the ink supply late in the development and/or manufacturing stage. For instance, if an ink formulation changes for an inkjet printer, ink supplies containing the new formulation can be programmed with priming parameters specific to the formulation instead of relying on priming procedures encoded into firmware. Firmware-based priming procedures may need to be updated to handle different types of ink and/or ink supply designs. Example ink supplies and methods to prepare ink supplies disclosed herein overcome this limitation by enabling priming parameters to accompany the ink in a storage device (e.g., a semiconductor-based memory) provided with the ink supply. Flexibility in using the inkjet printer arises from enabling a user of the inkjet printer to change ink formulations without requiring updates to firmware. This is beneficial because firmware updates may cause undesirable printer down time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An ink supply for a printer, comprising:
   an ink chamber within a housing of the ink supply, the housing being removably installable within the printer, the ink chamber to store ink; and
   a machine readable storage medium to store a first priming parameter, the machine readable storage medium carried by the housing of the ink supply, the first priming parameter having a value to cause the printer to configure a first priming procedure of the printer, the first priming parameter having precedence in configuring the first priming procedure over a first corresponding priming parameter stored in a second machine readable storage medium of a second ink supply concurrently installed in the printer along with the ink supply.

2. The ink supply as defined in claim 1, wherein the precedence of the first priming parameter over the first corresponding priming parameter is determined based on the value of the first priming parameter relative to a value of the first corresponding priming parameter stored in the second machine readable storage medium.

3. The ink supply as defined in claim 1, wherein the first priming parameter stored in the machine readable storage medium and the first corresponding priming parameter stored in the second machine readable storage medium indicate whether to enable or disable the first priming procedure.

4. The ink supply as defined in claim 3, wherein the first priming procedure applies to both the ink supply and the second ink supply.

5. The ink supply as defined in claim 3, wherein the precedence of the first priming parameter over the first corresponding priming parameter is determined when the value of the first priming parameter is to enable the first priming procedure and when a value of the first corresponding priming parameter is to disable the first priming procedure.

6. An ink supply for a printer, comprising:
an ink chamber within a housing of the ink supply, the housing being removably installable within the printer, the ink chamber to store ink; and
a machine readable storage medium to store a first priming parameter, the machine readable storage medium carried by the housing of the ink supply, the first priming parameter having a value to cause the printer to configure a first priming procedure of the printer, the first priming parameter having precedence in configuring the first priming procedure over a first corresponding priming parameter stored in a second machine readable storage medium of a second ink supply installed in the printer, the first priming parameter stored in the machine readable storage medium and the first corresponding priming parameter stored in the second machine readable storage medium indicating whether to enable or disable the first priming procedure, a second priming parameter stored in the machine readable storage medium indicating a first count of a number of priming procedures to be performed by the printer, the precedence of the first priming parameter over the first corresponding priming parameter determined when the first count is greater than a second count associated with a value of a second corresponding priming parameter stored in the second machine readable storage medium.

7. The ink supply as defined in claim 1, wherein the machine readable storage medium is to store a second priming parameter to instruct the printer to configure a second priming procedure of the printer different than the first priming procedure.

8. The ink supply as defined in claim 7, wherein the second priming parameter includes a second value to cause the printer to establish a time-based trigger for performing the second priming procedure based on elapsing of a period of time specified by the second value.

9. The ink supply as defined in claim 7, wherein the second priming parameter includes a second value to cause the printer to establish a usage-based trigger to initiate the second priming procedure when usage of an amount of the ink in the ink chamber satisfies a threshold specified by the second value.

10. The ink supply as defined in claim 7, wherein the second priming parameter includes a second value to cause the printer to establish a trigger to initiate the second priming procedure immediately before a print job.

11. The ink supply as defined in claim 7, wherein the machine readable storage medium is to store an updated priming parameter when at least one of the first or second priming procedures is completed.

12. The ink supply as defined in claim 7, wherein the machine readable storage medium includes a non-volatile memory device to continue storing values for at least one of the first or second priming parameters when the ink supply is transferred to another printer.

13. A system, comprising:
a first ink supply having a first housing removably installable within a printer, the first housing to carry a first machine readable storage medium to store a first priming parameter having a value to cause the printer to configure a first priming procedure of the printer; and
a second ink supply having a second housing removably installable within the printer, the second housing to carry a second machine readable storage medium to store a second priming parameter having a value to cause the printer to configure the first priming procedure of the printer, the first priming parameter having precedence in configuring the first priming procedure over the second priming parameter when both the first and second ink supplies are concurrently installed in the printer.

14. The system as defined in claim 13, wherein each of the first and second priming parameters indicates whether to enable or disable the first priming procedure.

15. The system as defined in claim 14, wherein the precedence of the first priming parameter over the second priming parameter is determined when the value of the first priming parameter is to enable the first priming procedure and when the value of the second priming parameter is to disable the first priming procedure.

16. A system, comprising:
a first ink supply having a first housing removably installable within a printer, the first housing to carry a first machine readable storage medium to store a first priming parameter having a value to cause the printer to configure a first priming procedure of the printer; and
a second ink supply having a second housing removably installable within the printer, the second housing to carry a second machine readable storage medium to store a second priming parameter having a value to cause the printer to configure the first priming procedure of the printer, the first priming parameter having precedence in configuring the first priming procedure over the second priming parameter, each of the first and second priming parameters indicating whether to enable or disable the first priming procedure, a third priming parameter stored in the first machine readable storage medium indicating a first count of a number of priming procedures to be performed by the printer, the precedence of the first priming parameter over the second priming parameter determined when the first count is greater than a second count associated with a fourth priming parameter stored in the second machine readable storage medium.

* * * * *